United States Patent [19]
Ruff et al.

[11] Patent Number: 5,675,769
[45] Date of Patent: Oct. 7, 1997

[54] METHOD FOR MANIPULATING DISK PARTITIONS

[75] Inventors: Eric J. Ruff; Robert S. Raymond; Scot Llewelyn, all of Orem, Utah

[73] Assignee: PowerQuest Corporation, Orem, Utah

[21] Appl. No.: 393,805

[22] Filed: Feb. 23, 1995

[51] Int. Cl.$^6$ .................................................... G06F 12/02
[52] U.S. Cl. ............................ 395/497.04; 395/497.01; 395/439; 395/492
[58] Field of Search ..................................... 395/438, 439, 395/480, 492, 497.01, 497.04, 700

[56] References Cited

PUBLICATIONS

Partition Resizer v. 1.1.1 Program Manual and Technical Information ©Zeleps 1994–95.
Welcome to FIPS version 1.1.1, Oct. 13, 1994.
Alsoft Power Utilities, Multidisk User's Guide ©1989–94.
Tyne, "Thinking Person's Guide to OS/2 2.1", 1993, pp. 193–195.

*Primary Examiner*—Eddie P. Chan
*Assistant Examiner*—Kevin L. Ellis
*Attorney, Agent, or Firm*—Computer Law++

[57] ABSTRACT

A method allows manipulation of disk partitions defined by an IBM-compatible partition table. The disk partitions may be located on one or more disks attached to one or more disk drives. Each partition has an associated file system type, such as FAT or HPFS. An interrupted manipulation may be resumed at a point in the progress of the manipulation near the point of interruption. Available manipulations include verifying the integrity of a partition's file system structures; displaying information about a partition; moving a partition to a different location; resizing a partition; and converting a partition from one file system to another file system. The resizing step is illustrated with particular reference to HPFS file systems and FAT file systems. The details required to perform these manipulations are attended to by an implementing program that requires only general direction from a user. Thus, the present invention provides a method that allows users who are unfamiliar with technical intricacies to easily manipulate IBM-compatible disk partitions, including extended partitions and logical partitions.

67 Claims, 9 Drawing Sheets

METHOD FOR MANIPULATING DISK PARTITIONS

FIELD OF THE INVENTION

The present invention permits manipulation of selected partitions of a computer disk drive More particularly the present invention relates to a method for safely shrinking expanding, moving, and copying hard disk partitions.

TECHNICAL BACKGROUND OF THE INVENTION

Computers utilize a wide variety of disks to store data. Disks are classified according to the storage medium employed, such as when "optical" disks are distinguished from "magnetic" disks. Disks are also classified as either "floppy" or "hard." Hard disks generally have greater storage capacity, faster data access times, and longer useful lives than floppy disks ("floppies"). Unlike hard disks, however, floppies are "removable." That is, floppies are easily released from, and reattached to, a disk drive which provides the computer with access to the data on the disk.

FIG. 1 illustrates a disk 10 attached to a disk drive 12. The disk 10 illustrates physical characteristics of both floppies and hard disks. The disk 10 contains a number of concentric data cylinders such as the cylinder 14. The cylinder 14 contains several data sectors, including sectors 16 and 18. The sectors 16 and 18 are located on an upper side 20 of the disk 10; additional sectors may be located on a lower side 22 of the disk 10. The sides 20, 22 of the disk 10 define a platter 24. Floppy disks contain only one platter and thus are either single-sided or double-sided. For clarity of illustration only one platter 24 is shown in FIG. 1, but hard disks often contain several platters and thus may include one, two, or more sides.

The upper side 20 of the disk 10 is accessed by a head 26 mounted on an arm 28 secured to the drive 12. To access different cylinders of the disk 10, the arm 28 moves the head 26 in toward the center of the disk 10 or out toward the periphery of the disk 10 according to the position of the desired cylinder. To access different sectors within a cylinder, the drive 12 rotates the disk 10 around a spindle 30, thereby rotating the desired sectors into adjacency with the head 26. Additional sides of a disk, including sides on additional platters, may be accessed in a similar manner by additional disk drive heads. Because each side of a disk is accessed by a corresponding disk drive head, the number of heads is sometimes used to indicate the number of sides of the disk that are accessible to the drive. For example, double-sided disks are accessed with double-headed drives.

A given sector on the disk 10 may be identified by specifying a head, a cylinder, and a sector within the cylinder. Heads are generally numbered from the top of the drive proceeding downward, beginning at zero. Cylinders are generally numbered from the outside edge of the platter proceeding inward, beginning at zero. Sectors within a cylinder are generally numbered from a marker in the disk medium proceeding either clockwise or counter-clockwise, depending on the direction of disk rotation in the disk drive, and beginning at one. A triplet specifying the head number, cylinder number, and sector number in this manner is known as a "physical sector address." For instance, the sector labeled as 16 in FIG. 1 could have a physical sector address of (head zero, cylinder seven, sector two), or more concisely, a physical address of (0, 7, 2). The terms "address" and "pointer" are used interchangeably herein.

Alternatively, a given sector may be identified by a "logical sector address." Each logical sector address is a single number rather than a triplet of numbers. The logical address of a sector corresponds to the number of sectors between the addressed sector and the "first" sector on the disk 10 along some specified path which traverses all available sectors in order. The first sector, known as "sector zero," is often located at a physical sector address of (0, 0, 1). One common traversal path begins at logical sector zero, traverses the sectors in cylinder zero of head zero, traverses the sectors of cylinder zero of head one, proceeds thus through cylinder zero on each successive head, proceeds to the sectors of cylinder one of head zero, and continues in like manner. However, other disk traversal paths are also used.

Disks are also classified by rules governing the physical organization of data on the disk. Many disks mold the available space into one or more "partitions" by a "partition table" located on the disk. For instance, MACINTOSH® computers utilize a partition table having a composition that is specifically adapted for use with the MACINTOSH operating system (MACINTOSH is a registered trademark of Apple Computer, Inc.). Many SUN® workstation computers utilize a partition table composition that is specifically adapted for use with the SunOS® File System (SUN and SunOS are registered trademark of Sun Microsystems, Inc.). Other examples abound; different partition table compositions are almost as common as different operating systems and different file systems, which number in the hundreds.

Unfortunately, different partition table compositions are usually incompatible. Detailed methods which correctly modify the contents of a first partition table will often scramble the contents of a second partition table if the first and second tables use different composition rules. A detailed method for reducing the number of disk sectors in a MACINTOSH partition, for instance, is likely to be of little help in shrinking a SunOS partition, and may even cause data loss if applied to the SunOS partition table.

One partition table composition, denoted herein as the "IBMcompatible" partition table, is found on the disks used in many IBM® personal computers and IBM-compatible computers (IBM is a registered trademark of International Business Machines Corporation). IBM-compatible partition tables may be used on both floppies and hard disks, and they may be used with magnetic disks, optical disks, and disks employing other storage media. IBM-compatible partition tables may also be used with a variety of disk sector addressing schemes, including without limitation schemes that employ traversal paths different from the path described above and schemes which assign logical sector addresses that start over again at zero for each partition on the disk.

As shown in FIG. 2, an IBM-compatible partition table 32 includes an Initial Program Loader ("IPL") identifier 34, four primary partition identifiers 36, and a boot identifier 38. As shown in FIG. 3, each partition identifier 36 includes a boot indicator 40 to indicate whether the partition in question is bootable. At most one of the partitions in the set of partitions defined by the partition table 32 is bootable at any given time.

Each partition identifier 36 also includes a starting address 42, which is the physical sector address of the first sector in the partition in question, and an ending address 44, which is the physical sector address of the last sector in the partition. A sector count 46 holds the total number of disk sectors in the partition. A boot sector address 48 holds the logical sector address corresponding to the physical starting address 42. On disks having more than 1024 cylinders, the starting address 42 and the ending address 44 contain predetermined maximum values if the actual values are too large to store in the space given in the partition table 32; the actual values can be derived from the sector count 46 and the boot sector address 48.

Some IBM-compatible computer systems allow "logical partitions" as well as the primary partitions just described. All logical partitions are contained within one primary partition; a primary partition which contains logical partitions is also known as an "extended partition." Logical partitions are represented by one or more lists of partition identifiers 36. Each list is attached in conventional fashion to one of the partition identifiers P1, P2, P3, or P4. Thus, the set of partitions defined by an IBM-compatible partition table includes any defined primary partition, regardless of whether that primary partition is an extended partition, and also includes any logical partitions defined by partition identifiers 36.

Each partition identifier 36 also includes a system indicator 50. The system indicator 50 identifies the type of file system contained in the partition, which in turn defines the physical arrangement of data that is stored in the partition on the disk 10 (FIG. 1). The system indicator 50 utilizes predefined constant values to designate various file systems. For instance, the constant value 01H indicates a 12-bit File Allocation Table ("FAT") file system first used by the MS-DOS® operating system (MS-DOS is a registered trademark of Microsoft Corporation). Other values designate other file systems, including the CP/M-86® file system (registered trademark of Novell, Inc), the XENIX® file system (registered trademark of Microsoft Corporation), the NOVELL file system (trademark of Novell, Inc.), a 16-bit FAT file system of the MS-DOS operating system, and the PCIX file system. Values not recognized by a particular operating system are treated as designating an unknown file system.

The system indicator 50 may designate a file system, such as the 12-bit FAT file system, which is used most widely in connection with a particular operating system, such as MS-DOS. However, operating systems and file systems are different components of the computer. The file system associated with a specific partition of the disk 10 (FIG. 1) determines the format in which data is stored in the partition, namely, the physical arrangement of user data and of file system structures in the portion of the disk 10 that is delimited by the starting address 42 and the ending address 44 of the partition in question. At any given time, each partition thus contains at most one type of file system.

The operating system manages access, not only to the disk 10, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

The operating system accesses the disk 10 in part through subprograms known as "file system drivers." These drivers use internal file system data and assumptions about the file system to translate more abstract information such as file names and read/write requests into more detailed information such as sector addresses and physical disk accesses. By appropriate use of file system drivers, a single operating system can access files stored according to different file systems. For instance, the OS/2 operating system can access both FAT files and High Performance File System ("HPFS") files (OS/2 is a mark of International Business Machines Corporation). File system drivers do not alter the type of file system that is contained in a partition, nor do they alter characteristics such as the partition's size or its location on the disk 10 (FIG. 1).

Those of ordinary skill in the art have a working knowledge of the disk 10, the disk drive 12, and the internal file system structures on the disk 10 and in computer memory. They will also have an understanding of operating systems and file systems in general. With regard to HPFS file systems, reference may be made to U.S. Pat. No. 5,371,885 issued to James G. Letwin for a HIGH PERFORMANCE FILE SYSTEM, which describes the structure of an HPFS file system. With regard to FAT file systems, reference may be made to Chapter Eight of *Advanced MS-DOS: The Microsoft guide for Assembly Language and C programmers*, by Ray Duncan, ISBN 0-914845-7702, 1986, which describes the structure of a FAT file system.

It is sometimes desirable to alter the contents of an IBM-compatible partition table. For instance, a person using a computer may wish to expand a particular partition to allow additional data to be stored in files within that partition. Conversely, the user may wish to shrink a specified partition by allocating fewer disk sectors to the partition. It may also be convenient or necessary to move a partition to a different location on the disk while substantially or exactly preserving the number of disk sectors allocated to the partition.

One conventional approach to modification of an IBM-compatible partition table begins by copying all necessary user and system data off the disk to a temporary storage location such as a tape or another disk. The data copied includes without limitation the contents of files created by the user such as textual documents and spreadsheets, the contents of files required to run applications such as word processors, and system data such as directory information. Some internal file system data such as sector allocation maps does not necessarily need to be copied, but is often copied anyway. The familiar disk utility FDISK is then used to update the IBM-compatible partition table. The newly specified partition is then formatted with the familiar disk utility FORMAT or a similar utility. Finally, the data is copied back into the new partition on the disk. During this copying process the file system copy utility creates appropriate new file system structures reflecting the current locations of data on the disk.

This approach to partition manipulation has several drawbacks. A temporary storage device with adequate storage capacity may not be readily available or affordable under the circumstances. Even if temporary storage is available, copying large amounts of data from the disk to temporary storage and then back again can take a substantial period of time.

In addition, manipulating IBM-compatible partition tables in this manner is confusing and dangerous for many computer users. The FDISK utility assumes that the user is familiar with the intricacies of IBM-compatible partition tables, physical disk addresses, logical partitions, extended partitions, operating system assumptions regarding partitions, and related matters. Users who are unfamiliar with these technical details may easily and inadvertently destroy data.

Less grievous but nonetheless undesirable situations can also arise if the user miscalculates the correct size or position of the new partitions. For instance, if the partition has been made too small to receive all the data from temporary storage, it becomes necessary to once again modify the partition table with FDISK, to reformat again, and to once again copy all the data from temporary storage into the reformatted partition. Even if everything works as desired the first time, this approach to partition modification can be very time-consuming. With a typical disk holding several hundred megabytes of data the process may require several hours to complete successfully.

Some conventional partition manipulation approaches are limited to shrinking FAT partitions or HPFS partitions. These approaches are not capable of shrinking logical partitions. They provide no capability for expanding a partition or moving a partition to a new location on the disk while preserving the partition's size. Moreover, known approaches allow user data to be lost if power to the computer is interrupted during the partition shrinking operation.

It is sometimes desirable to convert a partition from one file system to another. For instance, one known approach converts a FAT partition into an HPFS partition. However, the conversion is performed in place. That is, user data is left substantially in the same sectors on disk while FAT file system structures are converted into corresponding HPFS file system structures. This approach has the advantage of requiring only about enough additional disk space to hold the HPFS file system structures.

However, during virtually the entire conversion operation, the partition is in a hybrid state that matches no single known file system. Thus, it is very likely that user data will be lost if the file system conversion is interrupted. In particular, data is likely to be lost if power to the computer is interrupted for even a moment during the conversion. Moreover, this approach is not integrated with means for shrinking, expanding, and moving partitions, or with efficient means for checking the integrity and self-consistency of the file system before and after the conversion.

Thus, it would be an advancement in the art to provide a method that allows users who are unfamiliar with technical intricacies to easily shrink, expand, and move IBM-compatible disk partitions.

It would be a further advancement to provide such a method which prevents data loss caused by interruptions such as a power failure during the manipulation of a partition.

It would also be an advancement to provide such a method which properly shrinks, expands, and moves logical partitions and extended partitions.

It would be an additional advancement in the art to provide such a method which safely converts partitions from one file system to another file system.

It would be a further advancement to provide such a method which efficiently tests the integrity and consistency of the file system data within a partition.

Such a method for manipulating disk partitions is disclosed and claimed herein.

BRIEF SUMMARY OF THE INVENTION

The present invention provides a method for manipulating disk partitions defined by an IBM-compatible partition table. The disk partitions may be located on one or more disks attached to one or more disk drives. Each partition has an associated file system type, such as FAT or HPFS.

According to the present method, the partition table is initially read from the disk. The table contents may contain an RPI system indicator, which indicates that an earlier attempt at partition manipulation was interrupted by a power failure. If the RPI is present on the disk, an informing step notifies the user that the interrupted manipulation is being resumed. Otherwise, steps are taken to lock out other processes that could interfere with the requested partition manipulation. A data recovery method such as checkmarking or journaling is also used to allow resumption of the method near the point of interruption.

Available manipulations include checking or verifying the integrity and internal consistency of a partition's file system structures; displaying information about a partition such as its location, size, and associated file system type; moving a partition to a different location on a disk that presently holds the partition or to another disk; molding or resizing a partition to include either a lesser or greater number of disk sectors within the partition; and converting a partition from one file system to another file system.

Steps are taken at one or more points in the manipulation to detect inconsistencies in the file system data structures or other breaches in the integrity of the selected partition. If errors are detected, the user is informed. Conditions on the disk that were changed by the present method are then restored to the extent possible and control is returned to the invoking environment.

The resizing step is illustrated with particular reference to HPFS file systems and FAT file systems, but is also useful in reshaping partitions which hold a variety of other file systems. During a bounds determining step the maximum and minimum sizes of the desired modified partition are determined. An edge determining step takes appropriate actions depending on which edges of the selected partition are being moved to produce the modified partition. A size determining step determines the exact size of the modified partition by specifying the starting and ending physical addresses of the modified partition.

If the selected partition is being expanded, then certain additional steps are taken after the size determining step. The disk sectors being added may be tested first to locate and block out any bad sectors during a blocking step. During a creating step, a recovery sector is created on the very last sector of the proposed modified partition to permit data recovery in the event the manipulation is interrupted. During an adjusting step the contents of the partition table are adjusted to reflect the larger size of the modified partition and the RPI is placed on the disk, making the partition unrecognizable to MS-DOS, OS/2, and other familiar operating systems. During a bitmap creating step sector allocation structures are created as needed for the new area of the disk.

Regardless of whether the partition is being reduced or expanded, a size determining step determines the size and location of file system structures in the modified partition. An adjusting step then adjusts the size, location, and contents of the file system structures as needed to reflect differences between the selected partition and the modified partition. An exiting step releases any temporarily allocated disk space, removes the RPI from the disk, generally cleans up, and then returns control to the software which invoked it; in some cases the exiting step forces the computer to reboot so that changes in the partition table or file system structures will be detected by the operating system.

The moving/copying step is useful in replicating partitions utilizing a variety of familiar or unknown file systems. A location determining step determines the location of the edges of the modified partition. The present method provides the capability of moving and copying partitions from a first location, which is on a first disk attached to a first disk drive, to a second location. The second location may also be on the first disk, or it may be on a second disk that is attached to a second disk drive. During a creating step a first list is made of all bad sectors inside the selected partition. During a

7 testing step all sectors added by the proposed modified partition are tested, and any bad sectors found are placed in a second list. During a creating step a composite list of all bad sectors is created from the first and second lists just described. Any data or system information occupying disk sectors in the selected partition that would otherwise be copied to bad sectors in the modified partition are relocated such that they are copied instead to good sectors in the modified partition.

The selected partition's contents are then replicated. The bad sector list for the modified partition is updated, and an exiting step cleans up, removes the RPI from the disk, and exits back to the invoking environment or to a reboot, as appropriate. An alternative method allows the moving and copying of foreign or unknown partitions.

The details required to perform these manipulations are attended to by an implementing program that requires only general direction from a user. Thus, the present invention provides a method that allows users who are unfamiliar with technical intricacies to easily mold IBM-compatible disk partitions, including logical and extended partitions. The present method also utilizes the RPI and data recovery steps to prevent data loss caused by interruptions such as a power failure during the manipulation of a partition. The method also efficiently tests the integrity and consistency of the file system data within a partition at various points during the manipulation.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

8

DETAILED DESCRIPTION OF THE PREFERRED EMBODIMENTS

Reference is now made to the figures wherein like parts are referred to by like numerals. The present invention relates to a method for physically manipulating disk partitions. As noted above, each partition has an associated file system type, such as 12-bit FAT, 16-bit FAT, FAT-compatible, CP/M-86, XENIX, NOVELL, PCIX, or HPFS. The present invention will be illustrated mainly by reference to HPFS and FAT partitions defined as primary partitions on the disk 10 (FIG. 1) by an IBM-compatible partition table. However, those of skill in the art will appreciate that the scope of the present invention comprises manipulation of both primary and logical partitions on one or more disks of various kinds, and that such partitions may be associated either with the file systems listed expressly herein or with other file systems.

Overview of Disk Partition Manipulation

Figure 4:
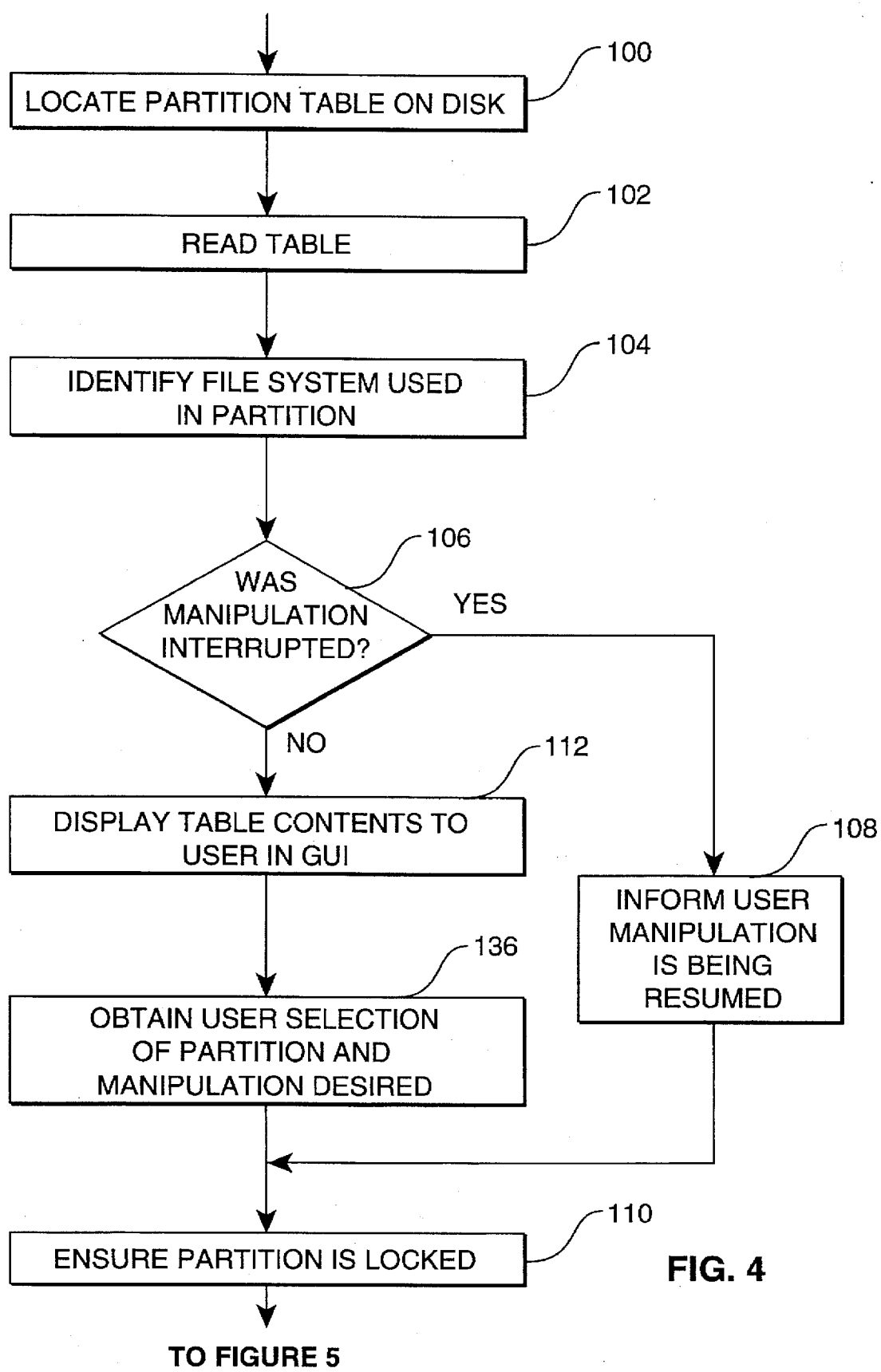
FIG. 4 is an initial portion of a flowchart illustrating a preferred method of the present invention.
Figure 5:
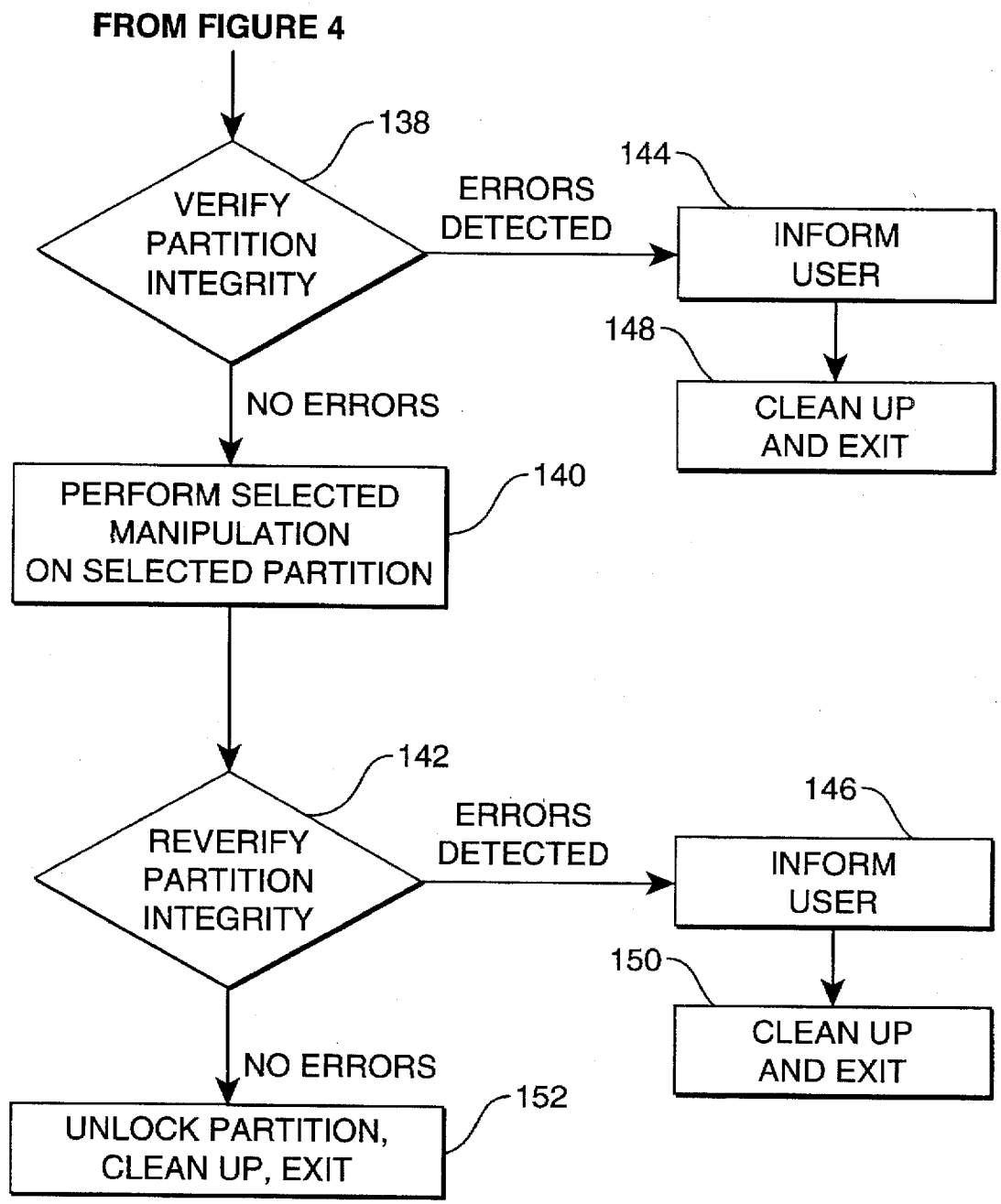
FIG. 5 is an additional portion of the flowchart shown in FIG. 4.

A preferred method of the present invention for manipulating disk partitions is illustrated by a flowchart in FIGS. 4 and 5. A computer program which implements this flowchart and/or other teachings of the present invention in order to assist users in molding disk partitions is referred to herein as an "implementing program." Those of skill in the art will readily create appropriate implementing programs according to the present invention by using computer languages such as C or C++, conventional compilers and linkers, and other tools familiar to computer programmers. Implementing programs may execute on conventional digital computers, including without limitation IBM-compatible personal computers.

All critical portions of the implementing program, such as those containing disk updates, are preferably protected by proper utilization of a data recovery method. A checkmarking data recovery method prevents data loss unless failure occurs in the middle of a disk write. Checkmarking stores progress markers on the disk within a selected partition. The progress markers correspond to incrementally increasing portions of the modification of the selected partition, thereby removing the need to repeat all of those portions over again if the modification is resumed after the flow of electric power to the disk drive is temporarily interrupted. A journaling data recovery method is generally faster than the checkmarking method and prevents data loss even if power fails in the middle of a disk write. Journaling preserves at least one copy of all user data on the disk at all times during the partition modification, thereby reducing the risk of loss of user data if modification is temporarily interrupted. According to alternative methods of the present invention, a data recovery method familiar to those of skill in the art may also be employed.

In a locating step 100, an IBM-compatible partition table (FIGS. 2 and 3) is located on the disk 10. The IPL 34 (FIG. 2) of the partition table is typically located at the beginning of the disk sector whose logical address is zero; the other portions of the partition table follow according to the partition table composition described herein and concepts familiar to those of skill in the art.

The partition table is then read from the disk 10 by a reading step 102. Reading is accomplished by one or more conventional disk sector read operations directed by the implementing program. Multiple read operations may be required to obtain the contents of partition identifiers 36 (FIG. 3) that define logical partitions. The copy of the table contents thus obtained may be left in the same relative positions in computer memory as they were in on the disk 10. Alternatively, the table contents in memory may be rearranged into data structures that are more convenient for use in the succeeding steps of the method. Those of skill in the art will readily determine appropriate data structures according to the teachings herein.

In this preferred method of the present invention, the table contents may contain an indication that an earlier attempt at partition manipulation has been interrupted. One cause of such an interruption is a temporary interruption of the flow of electrical power to the computer. Interruptions may also occur as a result of soft resets, hard resets, faulty hardware, or other circumstances.

It is presently preferred that an incomplete partition manipulation resulting from such an interruption be indicated by the presence of a unique "recovery partition identifier" ("RPI") in the system indicator 50 (FIG. 3) of a partition identifier 36 (FIG. 3) in the partition table. The RPI indicates that the partition is a "recovery partition," namely, that the partition is in a condition not associated with any known file system such as HPFS or FAT but is rather in a transitional state corresponding to interruption of the present method. Thus, any value not corresponding to a previously known file system and capable of representation in the space allotted to the system indicator 50 is an acceptable RPI value. One presently suitable RPI value is 3C hexadecimal; other suitable values may be identified by surveying the values used by familiar operating systems and file systems.

Accordingly, an identifying step 104 identifies the file system associated with each partition defined by the partition table. The identifying step 104 may be implemented by a table look-up, by a case or switch statement, or by another familiar means which recognizes the RPI of the present invention. An interrogating step 106 then checks the result of the identifying step 104 to determine whether an RPI was found in any of the partition identifiers 36.

If the interrogating step 106 determines that a partition manipulation was interrupted, an informing step 108 notifies the user that the interrupted manipulation is being resumed. The method then proceeds to a partition lock ensuring step 110. On the other hand, if the interrogating step 106 determines that no incomplete manipulation is pending, then a displaying step 112 displays at least a portion of the partition table contents to the user. The displaying step 112 preferably utilizes a graphical user interface ("GUI") in the implementing program to provide users with feedback regarding the current partition configuration and a command interface for molding that configuration.

Figure 6:
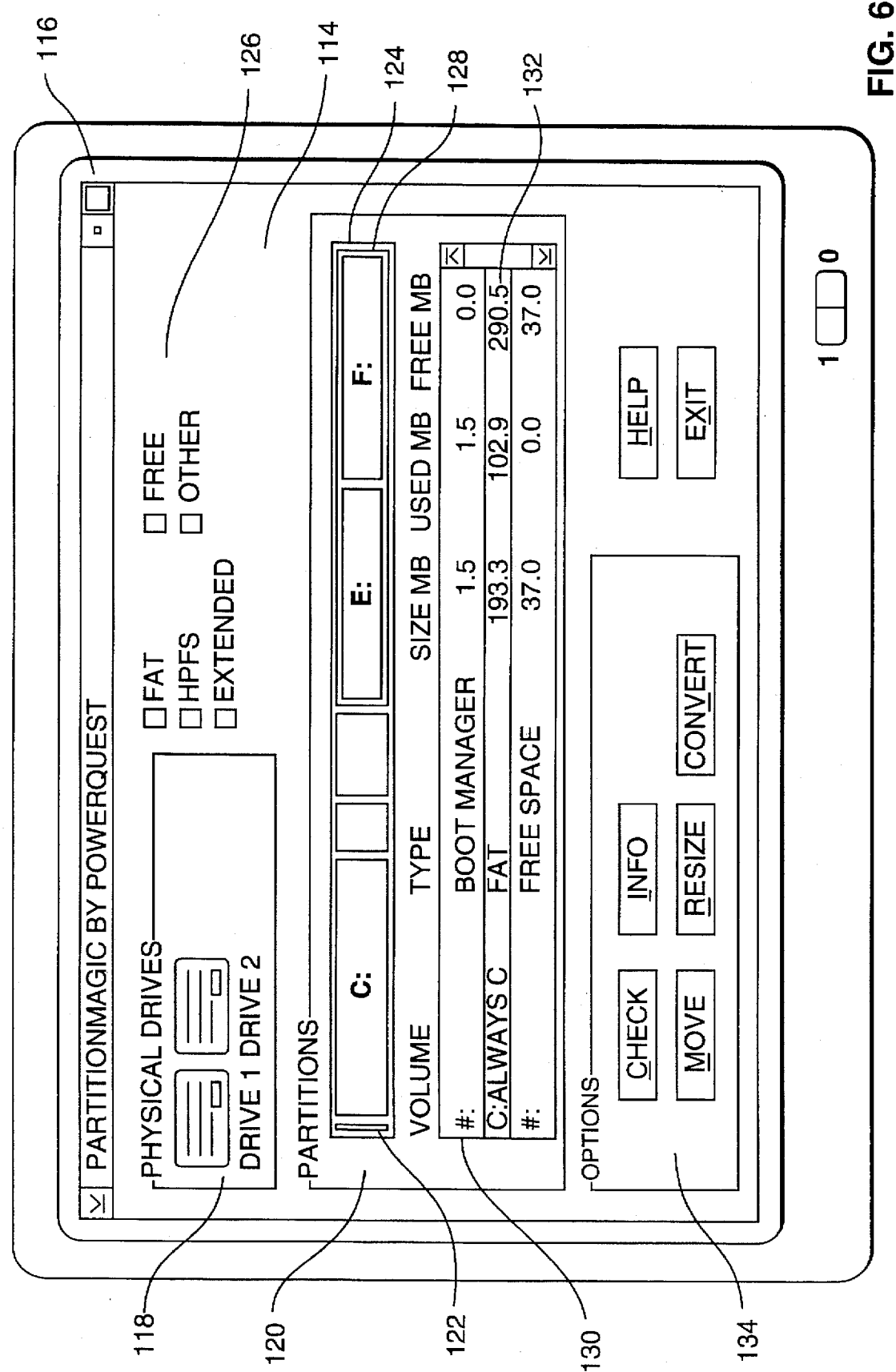
FIG. 6 is a front view of a computer screen illustrating a graphical user interface to a computer-based implementation of the present invention.

One suitable GUI 114 is illustrated in FIG. 6. The GUI 114 is displayed on a computer screen 116 by the displaying step 112 (FIG. 4). The GUI 114 includes a drive group box 118 which provides the user with information regarding the physical disk drives attached to the computer, including the drive names. Icons corresponding to the drives are preferably highlighted or otherwise altered in appearance to indicate the drive or drives for which partition information is presently being displayed.

A partition graph 120 provides information regarding the partitions presently defined by the partition table, including the names, relative positions, and file system types of the partitions. The left end 122 of the partition graph 120 corresponds to the disk sector at the lowest physical address (which is typically (0, 0, 1)), while the right end 124 of the partition graph 120 corresponds to the disk sector at the highest physical address on the particular disk in question.

Colors or graphical patterns may be used in the partition graph 120. The colors or patterns are selected from a legend 126 that matches colors to file system types, to free space not claimed by any partition, and to partition characteristics such as "extended" or "other" (unrecognized system identifier). In the example shown in FIG. 6, partitions E: and F: are enclosed by a box 128 to indicate that they are logical partitions. Partition C: is a primary partition, as indicated by the absence of an enclosing box.

Partition C: is also the current "selected partition," namely, the partition regarding which information is sought or upon which a manipulation operation is or will shortly be performed. Additional information about the partitions is provided in a partition list 130, with the details 132 regarding the currently selected partition (partition C:) preferably highlighted or otherwise altered in appearance.

An option box 134 lists the partition manipulation operations that are available through this implementation of the present method. As described herein, these manipulations include checking or verifying the integrity and internal consistency of a partition's file system structures; displaying information about a partition such as its location, size, and associated file-system-specific details; moving a partition to a different location on a disk that presently holds the partition or to another disk; resizing a partition to include either a lesser or greater number of disk sectors within the partition; and converting a partition from one file system to another file system. With reference to FIGS. 4 through 6, users interact with the implementing program through an interface such as the GUI 114 and through a mouse, a keyboard (neither shown), or other familiar input devices. During an obtaining step 136 user interaction results in selection of a partition and selection of a manipulation operation. Selections are communicated and acknowledged by means familiar to those of skill in the art.

The locked status of the selected partition (partition C: in FIG. 6) is then ensured during the lock ensuring step 110. Thus, if the lock ensuring step 110 is reached by way of step 108, then the manipulation is being resumed after an interruption and the selected partition may already be locked by the RPI. However, if no interruption occurred, that is, if step 110 is reached by way of steps 112 and 136, then locking is ensured by an operating-system-level lock, by halting other processes, by placing the RPI, or by some combination of these steps.

It is necessary to lock the selected partition to prevent processes other than the implementing program from accessing the partition while it is manipulated according to the present invention. Those of skill in the art will appreciate that such unexpected accesses by other processes may cause significant data loss.

Locking may be accomplished by one or more methods. It is presently preferred that access be prevented by engaging an operating-system-level partition lock such as is provided in certain operating systems. For example, the OS/2 operating system provides the capability to lock a logical drive, as identified by the drive letter, as well as the capability to lock an entire physical drive.

Operating-system-level partition locks are not available on some computers. In manipulating partitions on such computers, the user is preferably instructed to stop all non-implementing program processes, tasks, TSRs, and the like from executing. That is, the user must ensure that the implementing program alone has access to the disk(s) that hold the selected partition and the proposed modified partition.

A power failure or other condition which causes the computer to reboot may disable operating-system-level partition locks and/or restart non-implementing program processes which are capable of accessing the disk(s) that hold the selected partition and the proposed modified partition. It is therefore preferred that locking also be provided through the use of an RPI as described herein.

Locking by placement of the RPI on the disk preferably comprises the following steps. First, a free disk sector is located within the selected partition on the disk 10. The disk sector is allocated by updating the file system sector bitmap or comparable structure, and the current system indicator 50 (FIG. 3) value for the selected partition is stored on the disk 10 in the newly allocated sector.

The system indicator 50 on the disk 10 is then overwritten so that the partition identifier 36 corresponding to the selected partition contains the RPI. According to industry convention, an operating system will refuse to recognize partitions that are associated with a file system that is unknown to the operating system. By definition, the RPI corresponds to no known file system, so replacing a conventional system indicator value by the RPI effectively prevents the operating system and processes which run within constraints defined by the operating system from accessing the selected partition. The implementing program of the present invention is not thus constrained.

Thus, if the power fails prior to completion of the present method, the operating system will typically refuse to mount the selected partition and thus be prevented from trying to automatically "fix" the selected partition. However, the implementing program will detect the interruption by the presence of the RPI. The implementing program may then either properly complete the manipulation or, if that is not possible, the implementing program may attempt to place the selected partition in a more consistent and conventional condition before exiting. In extreme cases, the implementing program may resort to a data-salvaging step to allow the user to extract selected files for copying to another storage medium.

In the preferred method illustrated herein, great care is taken to detect inconsistencies in the file system data structures or other breaches in the integrity of the selected partition. Thus, a verifying step 138 precedes a partition manipulating step 140, and a reverifying step 142 follows the manipulating step 140. The steps 138 and 142 are collectively termed "verifying steps" herein. In the method illustrated, the verifying step 138 and the reverifying step 142 perform substantially identical tests on the file system at different times. In alternative methods according to the present invention, the verifying steps 138 and 142 may each perform different tests. Some methods of the present invention omit either or both of the verifying steps 138 and 142.

The tests performed during the verifying steps 138 and 142 depend on the particular file system that is associated with the partition; the file system was identified during the identifying step 104. To prevent data loss, tests are not performed on unknown file systems. However, disk reads may be used to test partitions associated with unknown file systems for "bad sectors," namely, disk sectors that are unreliable due to faults in the disk media or (occasionally) to disk drive hardware problems.

In testing the integrity of a FAT file system the verifying steps 138 and 142 may search for lost clusters, illegal values in the boot sector, or inconsistencies between copies of the file allocation table (if duplicates are present). In short, the verifying steps may generally perform those checks that are typically performed by the MS-DOS disk utility program CHKDSK. In testing the integrity of an HPFS file system, the verifying steps 138 and 142 may check for inconsistent links between Fnodes and for illegal values in the SuperBlock or SpareBlock, and may generally perform those checks that are typically performed by the OS/2 disk utility program CHKDSK. With regard to FAT, HPFS, or other file systems, the verifying steps may be performed in a manner familiar to those of skill in the art or by novel methods in concert with the teachings herein.

If errors are detected by the verifying step 138 or by the reverifying step 142, the user is informed by respective informing steps 144 and 146. Conditions on the disk 10 that were changed by the present method are then restored to the extent possible and the method relinquishes control of the disk 10 and the CPU during respective exiting steps 148 and 150. If no file system data structure errors are detected, the selected partition is unlocked during an exiting step 152, thereby opening the disk 10 for access by processes other than the implementing program. Other conditions on the disk 10 that were changed by the present method are also restored, to the extent that such restoration is consistent with the desired results of the manipulating step 140, during the exiting step 152. In alternative methods, some or all of the actions performed during the exiting step 152 are also performed, or are performed instead, at the end of the manipulating step 140 as described hereafter.

Those of skill in the art will appreciate that particular operating systems may fail to detect changes in the partition table or file system structures made by the implementing program. In such cases, the exiting step in question (step 148, 150, 152 182, 204, or 222) forces the computer to immediately reboot so that such changes will be detected by the operating system. Depending on the operating system involved, such changes may also be made known to the operating system through a system call rather than a reboot.

Figure 1:
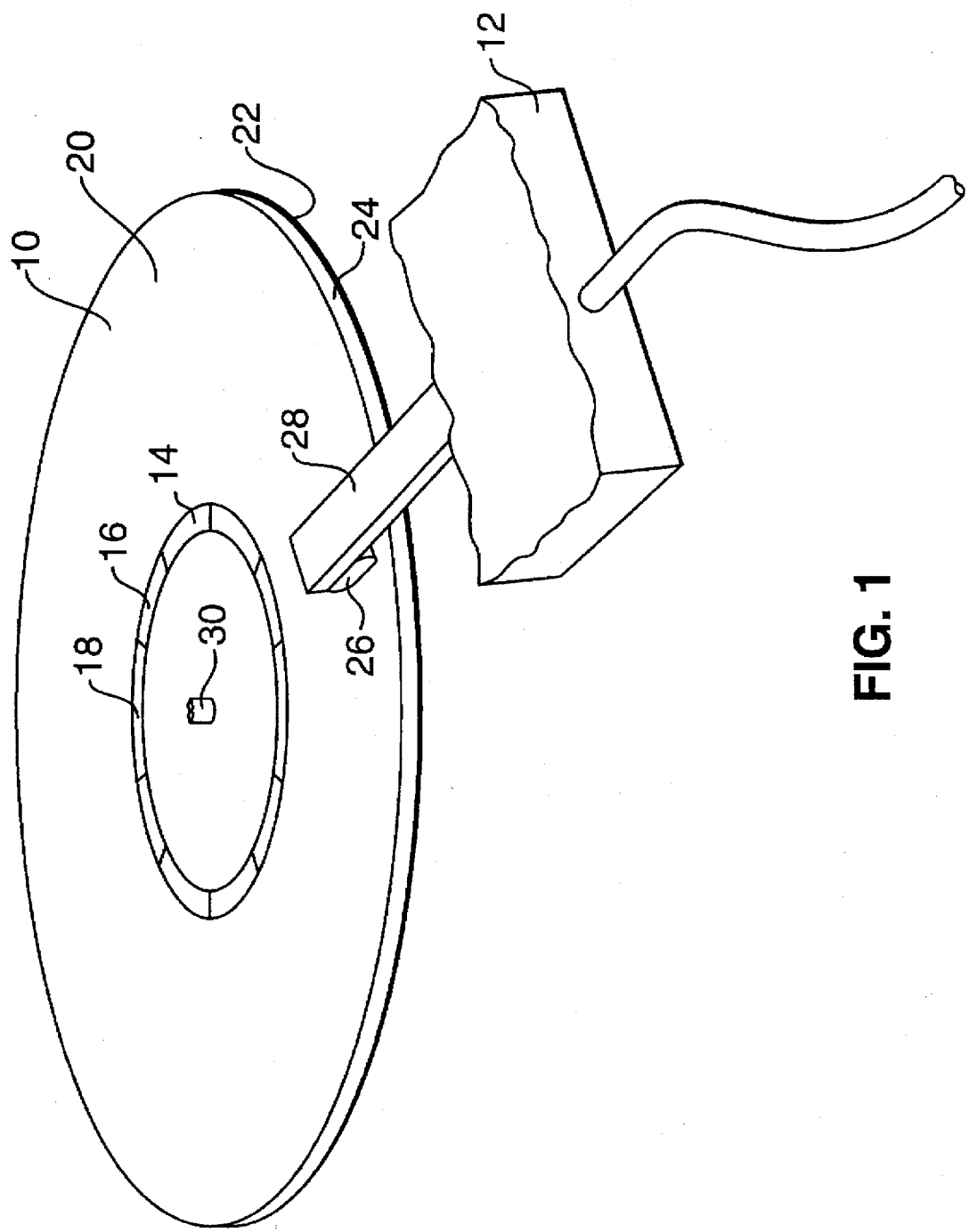
FIG. 1 is a partial cut-away view of a computer disk drive.
Figure 7:
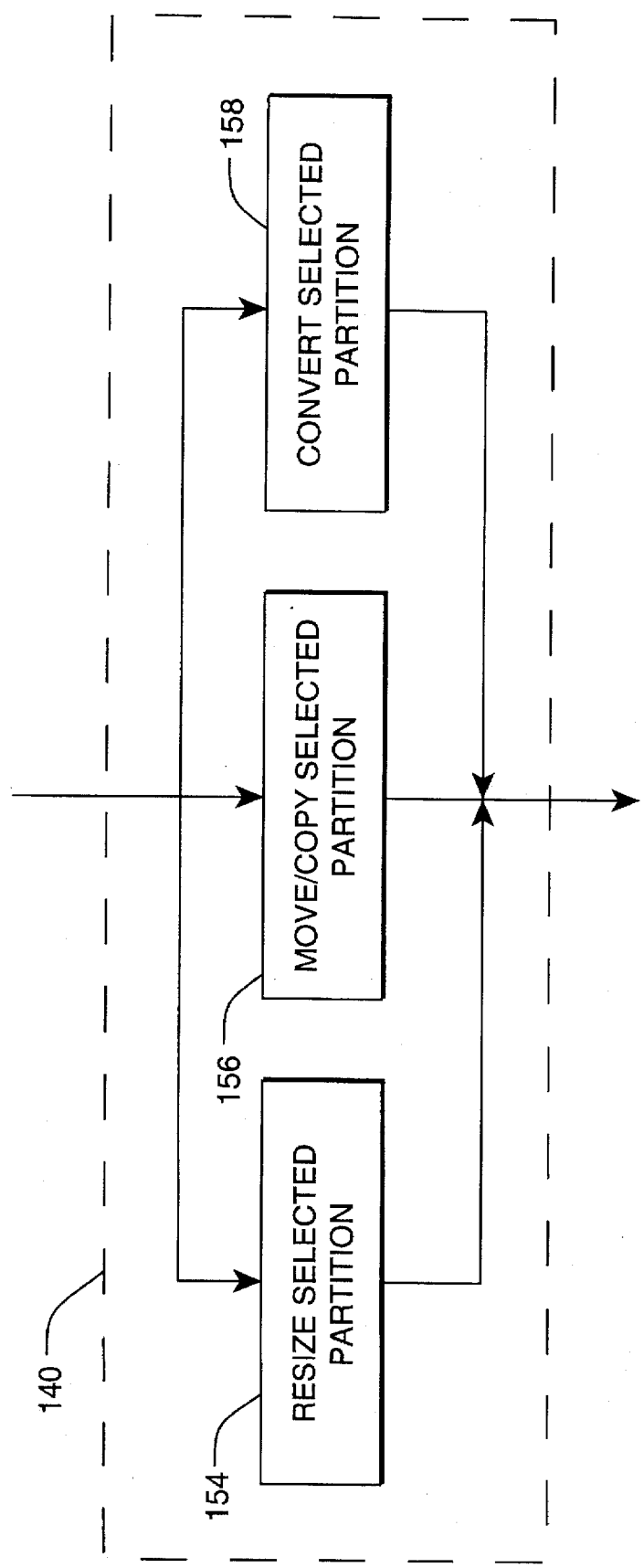
FIG. 7 is a flowchart further illustrating a partition manipulating step shown in FIG. 5.

With reference to FIG. 7, the partition manipulating step 140 comprises a resizing step 154, a moving/copying step 156, and a converting step 158. The resizing step 154 provides the capability of resizing the selected partition to include either a lesser or greater number of disk sectors. The moving/copying step 156 provides the capability of either moving or copying the selected partition to a different location on the disk 10 or to a disk attached to a different disk drive than the drive 12 (FIG. 1). The converting step 158 provides the capability of converting the selected partition from one file system, such as FAT, to another file system, such as HPFS.

Resizing Disk Partitions

Figure 8:
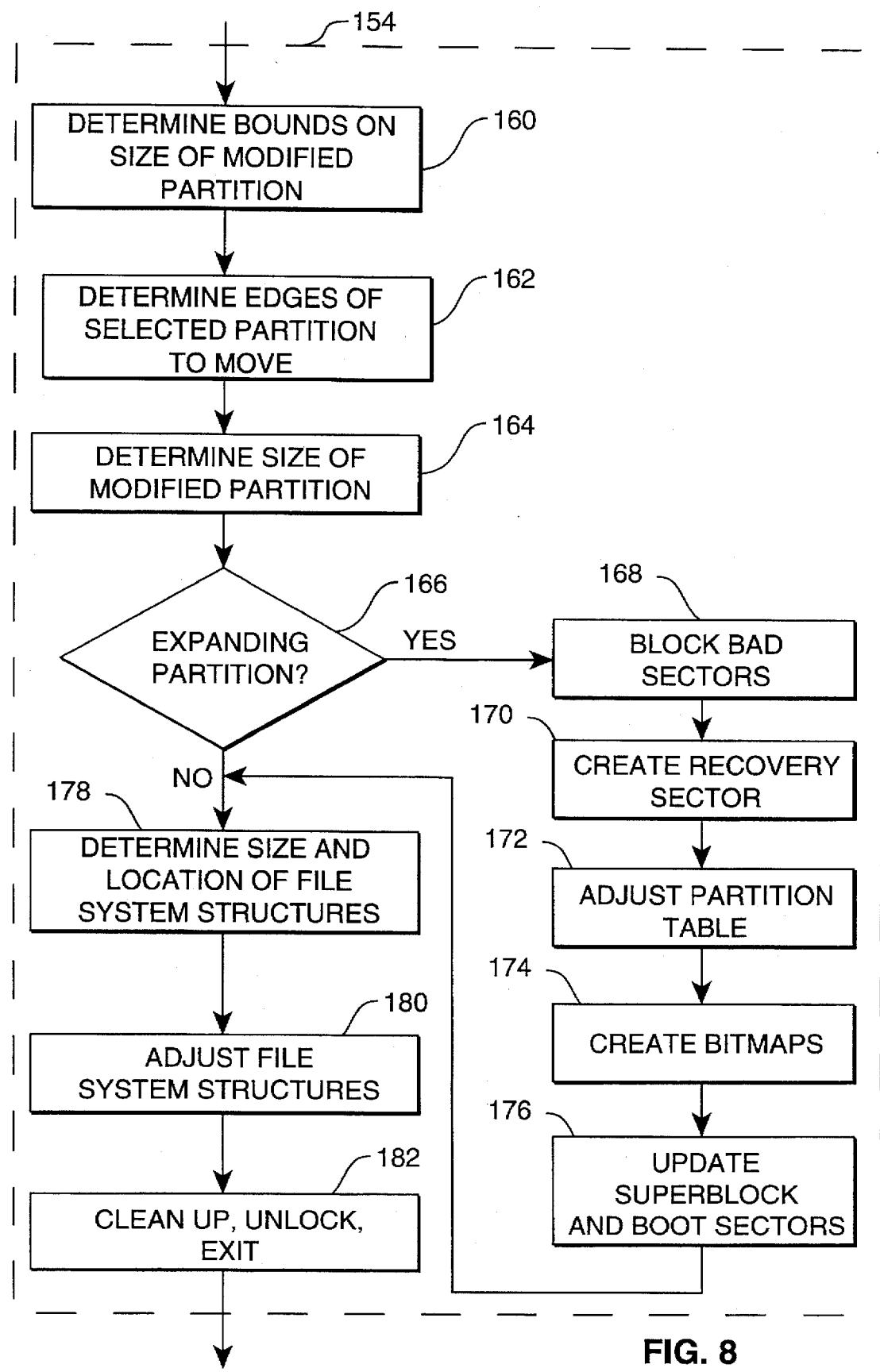
FIG. 8 is a flowchart further illustrating a partition resizing step shown in FIG. 7 in connection with a partition employing an HPFS file system.

A flowchart illustrating one method for accomplishing the resizing step 154 is shown in FIG. 8. Portions of the method apply particularly to HPFS file systems, while other portions of the method are useful in resizing partitions that utilize any of a variety of file systems.

Regardless of the type of file system contained in the partition that is being reshaped, steps are preferably taken to prevent data loss in the event that resizing is interrupted. These steps may include the use of a data recovery method in conjunction with the resizing step 154.

During a bounds determining step 160, the maximum and minimum sizes of a "modified partition" are determined. As used herein, a "modified partition" is a partition which is created from a selected partition by the manipulating step 140 (FIG. 5). Like other partitions, the modified partition has a "left" edge corresponding to the disk sector with the lowest sector address of any sector in the modified partition, and a "right" edge corresponding to the disk sector with the highest sector address of any sector in the modified partition. Regardless of the type of file system it contains, the modified partition cannot be safely expanded to push either its left edge or its right edge beyond either a neighboring partition boundary or a physical disk boundary. The edges of other partitions and of the disk 10 (FIG. 1) thus constrain the maximum size of the modified partition.

The size of the modified partition may also be constrained by particular file systems or operating systems. For example, FAT file systems have a maximum size that is based on a FAT file system structure known as a "cluster." The OS/2 operating system can only boot safely from partitions that do not extend past cylinder number 1023. These and other limitations are familiar to those of skill in the art.

Determination of the minimum modified partition size during the determining step 160 takes into account several factors, some of which may depend on the type of file system contained in the modified partition. Factors considered typically include the total size of all files and directories currently allocated in the selected partition, the number of subdirectories in the selected partition, the minimum free space required in the modified partition, the disk space likely to be consumed by file system structures in the modified partition, and a safety factor.

The safety factor is provided to permit the creation of additional file system allocation sectors. One method for determining the safety factor for an HPFS partition comprises the following steps. The implementing program determines a desired safety factor either by querying the user or through a default in the implementing program. The user may specify an increased safety factor to allow additional room for anticipated file growth. Conversely, if there is no need to allow room for file growth, the safety factor may be decreased to leave free disk sectors available for use by other partitions.

The implementing program also determines a smallest acceptable safety factor. The smallest acceptable safety factor for an HPFS partition is at least two percent of total partition size for partitions under 100 megabytes in size and at least two megabytes for larger partitions. Using any smaller safety factor may conflict with assumptions made by the OS/2 operating system about the safety factor and result in data loss.

In addition, the implementing program examines all of the bitmaps on the selected partition and counts all the set bits (each bit whose value is equal to 1) to obtain the total number of free disk sectors and thus the current free space (number of free sectors multiplied by bytes per sector). Finally, the implementing program uses the maximum of the desired safety factor and the smallest acceptable safety factor as the safety factor.

Regardless of the type of file system contained in the selected partition, the resizing step 154 can be performed by moving the selected partition's left edge, by moving its right edge, or by moving both edges. The choice of edges to move may be specified by the user through the GUI 114 (FIG. 6) or by default in the implementing program. An edge determining step 162 takes appropriate actions depending on the edge or edges being moved. If the right edge will be moved, then no sector addresses inside the existing system and directory structures need to be modified. Moving the right edge to perform the resizing step 154 is the easiest approach and is thus the preferred default.

If resizing is to be accomplished by moving the left edge or by moving both edges, then all sector addresses listed in all directory and other file system structures must be adjusted by a constant $N_{left\_edge\_shift}$ which equals the number of disk sectors by which the selected partition's left edge will be moved. If the left edge is moved to the left, $N_{left\_edge\_shift}$ must be added to each sector address; if the left edge is moved to the right, $N_{left\_edge\_shift}$ must be subtracted from each sector address. This adjustment by $N_{left\_edge\_shift}$ can be performed safely only when the partition has been changed into a recovery partition type by placement of the RPI on the disk 10 as described herein. Otherwise, if the implementing program is interrupted during the adjustment the partition's file system integrity will likely be compromised and data may be lost.

In an HPFS partition, if the left edge will be moved closer to the right edge, then all the data and file system structures between the current left edge position and the new position must be relocated before the left edge is repositioned. In all cases, since the critical boot sectors, SuperBlock and SpareBlock are located at the front of every HPFS partition, a "recovery sector" is created, as explained further below, and the boot sectors, SuperBlock, and SpareBlock are preserved on disk at a location recorded in the recovery sector prior to moving the partition's left edge. In practicing the present invention with non-HPFS file systems, file system structures that must be placed at a predefined offset within the modified partition are handled in a manner similar to the handling of the HPFS boot sectors, SuperBlock and SpareBlock.

It will be appreciated that if any one of the first twenty disk sectors of a proposed modified HPFS partition are bad sectors, then the proposed left edge cannot be used. Otherwise, the integrity of the modified partition will be severely compromised because the main boot sectors, the SuperBlock, and the SpareBlock must reside within those initial twenty sectors. Thus, it may be necessary to repeat steps 160 and 162 more than once to find an acceptable left edge location before proceeding to a size determining step 164. Such repetition may also be needed for non-HPFS partitions which contain structures that must be placed at a predefined offset within the modified partition.

The size determining step 164 determines the exact size of the modified partition by specifying the starting and ending physical addresses of the modified partition. These physical addresses may correspond exactly to positions specified by the user, or they may reflect adjustments to achieve a partition size that is a multiple of some file-system-specific or hardware-specific factor such as the number of sectors per track. A file system requirement that a partition contain a number of sectors that is an exact multiple of some integer larger than one is herein denoted a "clustering" requirement. At the conclusion of the size determining step 164, the implementing program has a definite value for the desired size of the modified partition, and an indication as to which edge(s) must be moved in order to resize the selected partition.

Regardless of the type of file system it contains, the selected partition may be either reduced or expanded during the resizing step 154. If the partition is reduced, no disk sectors outside the selected partition's boundaries will be added to produce the modified partition. If the selected partition is expanded, then disk sectors which are either to the left of the selected partition's left edge or to the right of its right edge will be included in the modified partition. A querying step 166 selects between reduction and expansion and thus determines whether certain additional steps, labeled 168 through 176 in FIG. 8, are taken after the size determining step 164.

If the selected partition is being expanded, then the disk sectors being added may be tested first to locate and block out any bad sectors during a blocking step 168. The disk area being added to the selected partition to create the modified partition ("new area") may be tested for bad sectors as follows. First, write a known pattern to each sector sequentially from the first sector in the new area to the very last sector. This has the effect of flushing any software or hardware disk cache that might otherwise invalidate the test results. Then read the sectors that were just written.

Flushing may be quite time-consuming, so it should be skipped if there is a way to otherwise guarantee that the sectors to be tested are not already in the computer's memory. In many computer systems, flushing is not required because it is very unlikely that sectors not already inside the selected partition will have been read into memory.

Next, maintain a list or table of the addresses of bad sectors identified during the flushing and subsequent reading. Bad sectors are identified as such by an error code from the disk drive to the implementing program indicating that the sector write failed. To reduce the amount of time spent moving the disk drive head 26 (FIG. 1), the disk sectors are preferably accessed in consecutive order, as is known in the art. The addresses of any sectors for which the sector access (read or write) failed is added to the list of bad sectors. The result is a complete list or table in computer memory of all bad sectors in the new area of the disk 10.

According to one alternative method of the present invention which is adapted for use with HPFS partitions, the test for bad sectors in the new disk area is omitted if the FAST_FORMAT flag inside the SpareBlock has been set. Analogous flags may be used in alternative methods adapted for use with other file systems. Those of skill in the art will appreciate that while this omission tends to substantially decrease the time required to expand the selected partition, omitting the test also introduces the possibility that a file system structure will be assigned storage locations in one or more bad disk sectors. Such an approach is unreliable and places the integrity of the file system at risk. The tradeoff is therefore between safety and speed.

Many contemporary disks have almost flawless media with few or no bad sectors, and many disk drives provide internal hardware support for revectoring bad sectors without direct intervention by the operating system or by a file system driver. On such systems the risk of data loss from skipping the test for bad sectors is very small. However, the implementing program may be unable to access DIP switch settings, memory-mapped disk drive registers, or other hardware to determine the age or revectoring capability of the disk drive 12. It is therefore generally preferred to perform the test for all bad sectors. At a minimum, it is preferred that the new locations on the disk 10 which are targeted to hold the file system structures be tested so that bad sectors can be identified and avoided.

During a creating step 170, a recovery sector is created on the very last sector of the proposed modified partition. The recovery sector is illustrated in connection with specific file systems (HPFS and FAT), but those of skill in the art will appreciate how analogous recovery sectors are created for other file systems. The finished recovery sector contains the system indicator 50 (FIG. 3) of the selected partition, and an indication of the partition manipulation being performed (such as "shrinking partition from 200 megabytes down to 127 megabytes by moving the right edge toward the left edge"), and information on the type of data recovery method being used to protect the user's data. During partition manipulation, additional information is stored in the recovery sector as required by the recovery prevention method to allow resumption of the method at an appropriate point within the method after power failure or another interruption. An HPFS recovery sector also holds the addresses of the SuperBlock and SpareBlock system sectors.

If it is determined that the last sector of the modified partition is occupied by the selected partition, then the data in that last sector is moved to another free sector to make room for the recovery sector. This determination is made by scanning all file system structures and directories to determine which structure or file uses this last sector. Once the internal file system structures using the last sector are identified, the sector is copied elsewhere and the appropriate file system structures are updated to reflect the new location. This is preferably accomplished in concert with the data recovery method being used.

During an adjusting step 172, the contents of the partition table 32 (FIG. 2) are adjusted to reflect the larger size of the modified partition. At the same time, the partition system indicator 50 (FIG. 3) is replaced by the RPI, making the partition unrecognizable to MS-DOS, OS/2, and other familiar operating systems. If the partition table is located near the left edge of the selected partition, then the partition table 32 is simultaneously moved to its new location near the left edge of the modified partition. If the partition contains an HPFS file system, the boot sector and other HPFS structures are not adjusted yet.

During a bitmap creating step 174 bitmaps or analogous sector allocation structures are created as needed for the new area of the disk 10, in an arrangement compatible with the file system of the modified partition. These bitmaps identify which disk sectors in the modified partition are free, and which are allocated. If the left edge of the selected partition is being moved, one alternative method of the present invention also shifts the HPFS bitmaps until they reside on either the first or the last sector of their respective data bands.

In HPFS partitions, new bitmap locations are added to the indirect list, and the list is updated on the disk 10. If the selected partition is being reduced, excess bitmaps are not yet removed because they may point to critical data or other file system structures on the disk. The SuperBlock and the boot sector are then updated on the disk 10 to reflect the expanded partition size during an updating step 176.

A size determining step 178 is performed to determine the size and location of file system structures in the modified partition. According to one method of the present invention, which is adapted for use in resizing HPFS partitions, this step 178 comprises determining the new size and location of all internal HPFS system structures. The placement conventions exhibited by HPFS structures in the selected partition are followed to the extent possible in view of the modified partition size. Thus, each system structure that is already within the modified partition boundaries is preferably left in the same location on the disk 10.

An adjusting step 180 adjusts the size, location, and contents of the file system structures as needed to reflect differences between the selected partition and the modified partition. Regardless of the type of file system found in the selected partition, an iterative approach may be used during this adjusting step 180. A first attempt is made to relocate all the system structures in a manner consistent with the bounds of the modified partition and the file system in question. This first attempt may fail due to overlaps between old and new positions of the structures or due to a lack of contiguous free space in the partition large enough to receive the structures. In the event of such failure, data and other structures on the disk 10 that can be moved are moved to provide an appropriate free location for the file system structures, after which another attempt is made to move and adjust the file system structures.

If the selected partition is expanded, it is possible that many HPFS system structures will not need to be resized or moved. In addition, whether the partition is reduced or expanded, it will be appreciated that certain HPFS structures may be resized in place by techniques readily determined by those of skill in the art. Similarly, for non-HPFS file systems, any system structures that can be left in place without compromising the integrity of the file system are preferably left in place.

In the course of the adjusting step 180 it is generally best to start with the largest structures first. One method for resizing HPFS system structures comprises the following steps. Initially, adjust the current directory band unless its current size and location are acceptable. If the current band size must be reduced, reduce the number of sectors allocated to the directory band. Free any sectors in the released portion that are not occupied by directory blocks and are not listed in the bad sector list. These sectors are freed by clearing the appropriate bits in both the sector bitmaps and in the directory band map. If the newly sized directory band can remain at its current location on the disk 10 in compliance with HPFS structure arrangement rules, then resizing of the directory band has been accomplished.

Otherwise, if there is a free location elsewhere in the modified partition that is large enough for the directory band, the new space is allocated and the entire band is copied to that location. The directory band pointers in the Super-Block are adjusted accordingly. The old location is marked free, except for any sectors listed in the bad sector list, and resizing of the band in question is completed.

If there is no free location, the HPFS directory band is reduced to a single directory block corresponding to the current last directory block. An area of adequate size to hold the directory band is then freed from another portion of the disk 10 in the modified partition. The reduced band is reconstructed in the freed area and as many of the directory blocks as possible are copied into it.

If the directory band must be expanded, an initial check is made to determine if the band can be expanded in place. If adequate contiguous space is available, the band is expanded in place. If adequate space is not available, an area large enough to accommodate the expansion is freed by properly and safely removing data or system structures from disk sectors contiguous to the current directory band location and the band is expanded into that area. Alternatively, the entire band may be copied to a new area of adequate size within the modified partition boundaries, after which the band is appropriately expanded in place.

Next, the HPFS spare directory block list is checked. It may be possible to obtain locations within the modified partition for spare directory blocks left outside the modified partition by the partition resizing operation. If necessary, user data may be moved to free a sufficiently large contiguous space within the modified partition.

Then the HPFS list of hot-fix sectors is examined. If the selected partition is expanded, additional sectors are allocated as needed from the pool of sectors in the new area added by the expansion. If the selected partition is reduced, entries are removed from the tail end of the list and any hot-fix sectors outside the boundaries of the modified partition are relocated.

Finally, other HPFS file system structures are adjusted. The last bitmap is moved if necessary to satisfy a clustering requirement. If the selected partition is reduced, any extra bitmaps are not yet removed. However, bad sectors which are not part of the modified partition are removed from the bad sector list.

Regardless of the type of file system involved, the following steps are taken if any file system structures were not relocated to proper locations during the above steps or during analogous steps performed for non-HPFS file systems. The size of the disk area needed to contain all the file system structures to be relocated is determined by techniques familiar to those of skill in the art in view of the teachings herein. One or more contiguous areas inside the user data areas is then chosen and "cleared" of data by properly and safely relocating the data. Size determining, clearing, and adjusting steps are repeated as necessary to finish relocating the file system structures into the newly cleared areas. If the selected partition is being reduced then all files, directories, and other structures are moved from the truncated region to free areas within the modified partition. This is not infrequently the most time-consuming part of the manipulation.

An exiting step 182 follows the adjusting step 180. If the exiting step 182 follows an expansion of the selected partition, then this portion of the implementing program (a) releases any temporarily allocated disk space, and (b) returns control to the software which invoked it or forces a reboot before other processes can execute, as appropriate. If the exiting step 182 follows a reduction in partition size, all bitmaps to data areas beyond the reduced modified partition are removed from the bitmap list. The partition table 32 (FIG. 2) is adjusted to reflect the smaller partition size. In the case of reduction of an HPFS partition, the SuperBlock and the boot sector are simultaneously adjusted to reflect the modified partition size.

Regardless of whether the selected partition is reduced or expanded, the system indicator 50 (FIG. 3) is restored during the exiting step 182 to its initial value, such as a value corresponding to an HPFS file system. The postponed adjustments in HPFS back pointers for directories and other file system structures are also preferably made at this time.

Figure 2:
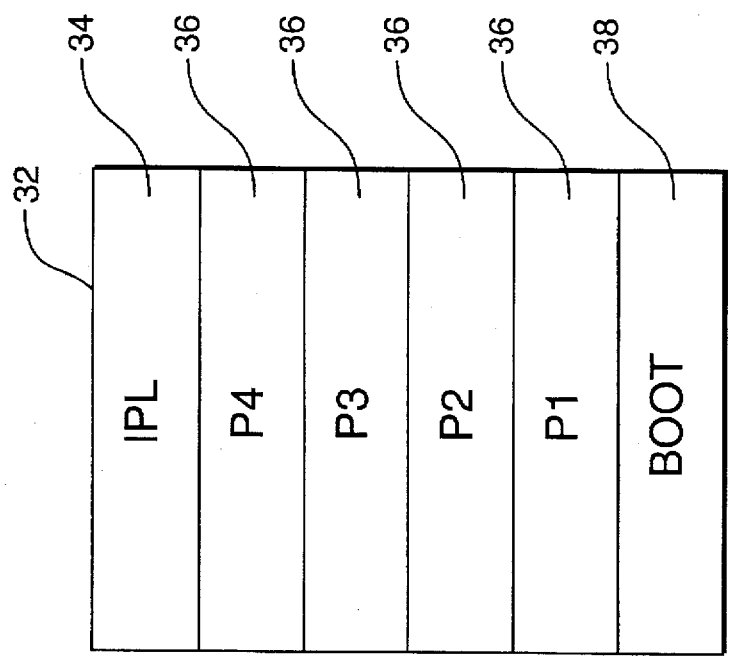
FIG. 2 is a diagram illustrating an IBM-compatible partition table.

As part of the clean-up portion of the exiting step 182 in cases where the partition is to be reduced, some methods according to the present invention check for any sectors in the selected-but-not-yet-reduced partition which are not bad sectors and which are still allocated. If any such sectors are found, the implementing program does not alter the partition table 32 (FIG. 2). Instead, the user is informed that the selected partition could not be reduced, and control is returned to the invoking environment. This situation may occur when all or most of the free space in the selected partition would be freed by the reduction or when there are many bad sectors in the selected partition.

Figure 9:
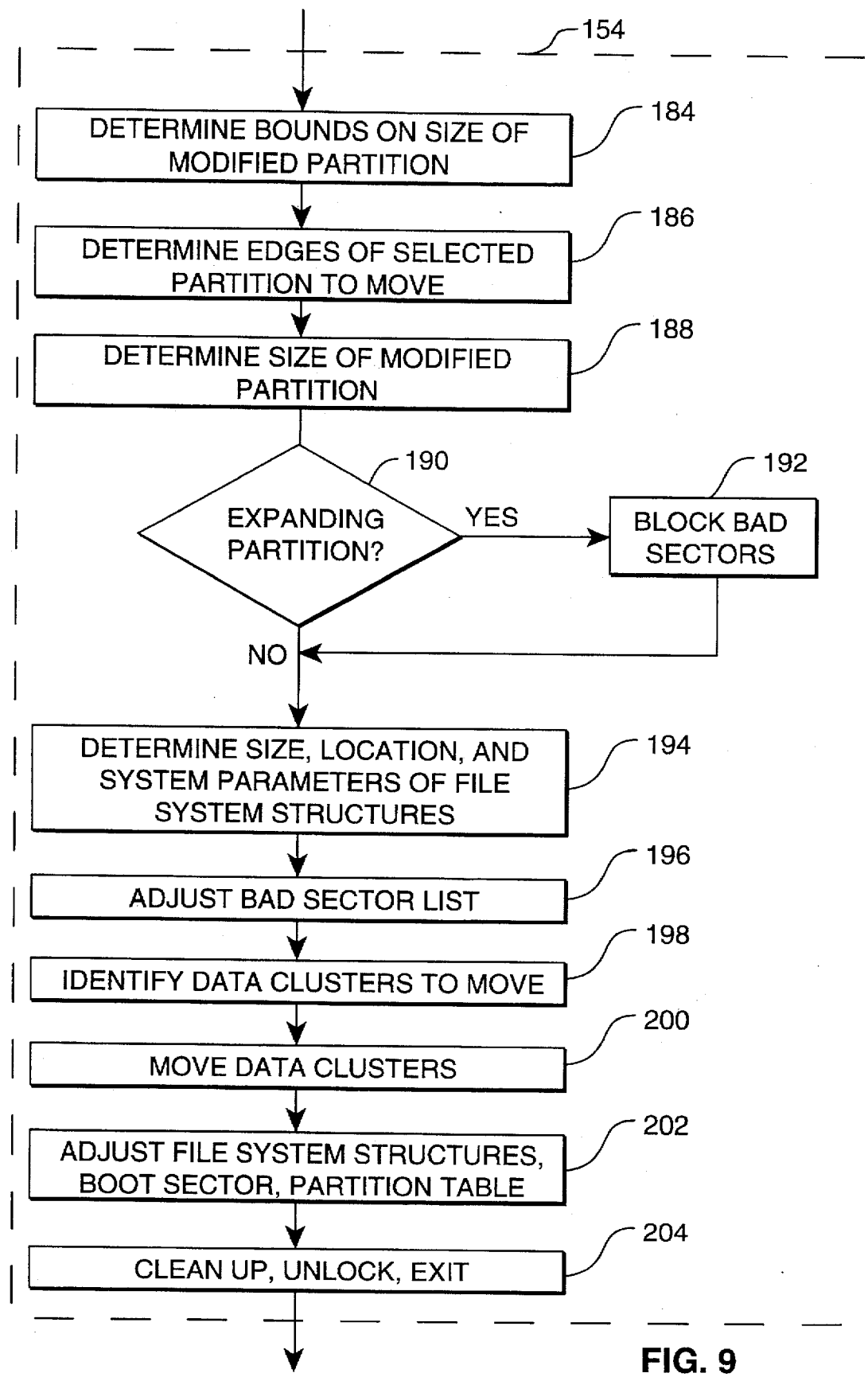
FIG. 9 is a flowchart further illustrating a partition resizing step shown in FIG. 7 in connection with a partition employing a FAT file system.

A flowchart illustrating an alternative method for accomplishing the resizing step 154 is shown in FIG. 9. Those of skill in the art will readily identify portions of the method which apply particularly to FAT file systems. Such persons will also recognize that other portions of the method are useful in resizing a variety of file systems, including without limitation HPFS and FAT file systems.

During a bounds determining step 184, the maximum and minimum sizes of a modified partition are determined substantially in accordance with the bounds determining step 160 (FIG. 8) previously discussed. However, those of skill in the art will appreciate that the minimum modified partition size of a FAT partition depends in part on the disk space consumed by the root directory and by the file allocation table(s).

For simplicity, the discussion herein of those aspects of the present invention which relate specifically to FAT file systems assume a 512-byte logical sector size inside FAT partitions and a 512-byte physical sector size on the disk 10 (FIG. 1). However, the present method is readily tailored for use with other sector sizes by those of skill in the art.

An edge determining step 186 takes appropriate actions depending on the edge or edges of the selected partition which are being moved, substantially in accordance with the edge determining step 162 (FIG. 8) previously discussed. A size determining step 188 determines the size of the modified partition and determines the number of logical sectors in the modified partition substantially in accordance with the size determining step 164 (FIG. 8) previously discussed and the particulars of the file system involved.

A querying step 190, which is substantially similar to the querying step 166 in FIG. 8, determines whether the selected partition is being expanded. If expansion is necessary, then the disk sectors being added to the selected partition may be tested first to locate and block out any bad sectors during a blocking step 192 that is substantially similar to the blocking step 168 (FIG. 8). Alternatively, some or all of such testing may be omitted, thereby saving time but possibly increasing the risk of data loss as previously discussed.

During a characteristic determining step 194, certain characteristics of the modified FAT partition are determined, including the size of the boot sector(s), the desired size of each file allocation table and the size of the root directory (collectively, the "system area"). The "data cluster area" is all remaining space on the disk 10 in the modified partition outside of the system area. The data cluster area may include disk area not presently used but reserved for future growth. The size of each file system structure is preferably determined such that no clusters need to be realigned, thereby substantially reducing the time needed to resize the selected partition by avoiding physical relocation of all used data sectors.

The present method preferably resizes a selected FAT partition such that the resulting modified partition passes any industry standard CHKDSK program with no serious errors. To accomplish this, certain rules set forth below must be followed.

According to the presently preferred method of the present invention, the number of sectors per cluster ("cluster size") in the modified partition will equal the cluster size of the selected partition. Alternative methods permit the cluster size to be reduced or increased, provided that the cluster size is always a positive integer power of two: one, two, four, eight, sixteen, and so forth are acceptable cluster sizes. These alternative methods increase the flexibility of the implementing program but also increase the time required to resize a FAT partition.

If cluster size is reduced, the new smaller clusters will already be properly aligned and need not be moved unless they would be overlaid by the expanded file allocation table(s) or root directory of the modified partition. However, the smaller data clusters at the end of a file should be freed if they are no longer required to hold data. The change to smaller clusters may therefore free a significant amount of space on the disk 10. For example, a file that contains only 100 bytes of meaningful data occupies eight kilobytes when eight-kilobyte-clusters are used, but only occupies one kilobyte when one-kilobyte-clusters are used. When the cluster size is reduced, the other seven smaller clusters that previously formed part of the original eight-kilobyte-cluster can and should be freed by techniques familiar to those of skill in the art.

If cluster size is increased, it may be necessary to move clusters about on the disk 10 to make them contiguous with adjoining clusters, to achieve proper alignment, and/or to obtain sufficient free space into which the smaller clusters can safely expand. Regardless of whether the cluster size is reduced or increased, the original cluster numbers used in the file allocation table(s) must be replaced by new cluster numbers which reflect the change in cluster size.

If any FAT system structure needs to be reduced or expanded, then the total number of sectors allocated to all file system structures must be adjusted only by an integer multiple of the cluster size. Following this rule may require padding some system structures or shrinking the reserved area or the root directory, but the size of such changes is limited to less than one cluster of disk space. This rule arises from the desire to maintain the current cluster alignment on the disk 10 (FIG. 1) and thus prevent major restructuring of all used data clusters. An alternative method of the present invention shifts all data clusters by a constant number of sectors in order to accommodate cluster restructuring and realignment. However, this alternative requires significantly greater time to resize the selected partition, and also adds slightly to the complexity of the method.

The number of reserved boot sectors is also determined during the characteristic determining step 194. Typically one boot sector is reserved by FAT file systems. The present method produces a modified partition having the same number of reserved sectors as the selected partition, whatever that value may be. When padding is required to preserve cluster alignment, it is preferred that the reserved boot sector area not be padded, as some older FAT-specific disk utilities assume that only one sector is reserved; reserving additional boot sectors may cause data loss if such utilities are subsequently used.

The minimum size (in sectors) of the modified partition's root directory and the minimum desired size of that root directory are also determined during the characteristic determining step 194. The desired size must be greater than or equal to the minimum size. Most FAT partitions formatted by standard MS-DOS utilities contain 512 directory entries, filling exactly thirty-two 512-byte disk sectors. However, under the present method the root directory may be extended beyond thirty-two sectors. Likewise, if the selected FAT partition's root directory covers more than thirty-two disk sectors and any of its end sectors are unused, it may be reduced to cover fewer sectors. The number of sectors in the root directory does not impact FAT file system integrity if there is at least one sector and the modified partition contains enough sectors to hold the contents of the selected partition's root directory. However, some users may wish to make thirty-two sectors a minimum value.

During the characteristic determining step 194, the number of sectors required to hold each copy of the file allocation table is also determined. Each file allocation table must contain exactly enough sectors to hold all cluster entries. If too few sectors are allocated, data will be lost. If too many sectors are allocated, the modified partition may be rendered unusable by OS/2 or another operating system.

The number of data clusters in the modified partition is also determined. If the total number of data clusters (calculated after the size of all system structures is determined) is greater than 4085 clusters, each cluster entry requires two bytes of space in each file allocation table. Otherwise, each cluster entry requires 1.5 bytes of space in each copy.

One method for accomplishing these determinations is set forth below in a form readily understood by those of skill in the art. All calculations should be integer truncated at each step, unless otherwise specified:

I. Determine the number of cluster entries per file allocation table sector. For a 512-byte sector, 16-bit file allocation tables hold 256 entries per sector (16 BIT_CLUST_ENTS is 256), and 12-bit file allocation tables hold 341 and ⅓ entries per sector (12 BIT_CLUST_ENTS is 341 and ⅓). Note that the first two cluster entries for every file allocation table are always used and reserved by the system.

II. Set OLD_FIRST_DATA_SECT to the logical sector address of the first data sector of the selected partition.

III. Set TOTAL_SECTS to the total number of sectors in the modified partition as determined in the size determining step 188.

IV. Set BOOT_SECTS to the number of reserved boot sectors in the modified partition as determined in the characteristic determining step 194.

V. Set ROOT_SECTS to the number of root-directory sectors in the modified partition as determined in the characteristic determining step 194.

VI. Set FAT_SECTS to zero.

VII. Set SECTS_PER_CLUST to the selected partition's cluster size.

VIII. Set NUM_FATS to the number of copies of the file allocation table maintained on the disk.

IX. Follow the next loop 4 times to compute FAT_SECTS, NUM_CLUSTS, and NEW_FIRST_DATA_SECT. Convergence to the proper values often occurs by the end of the second iteration of the loop, but special cases require a third loop iteration to test for proper convergence, and the fourth loop iteration ensures convergence in all cases. At the end of each iteration of the loop, record the values of FAT_SECTS, NUM_CLUSTERS, and NEW_FIRST_DATA_SECT.

A. NEW_FIRST_DATA_SECT=BOOT_SECTS+ROOT_SECTS+(FAT_SECTS×NUM_FATS). Align NEW_FIRST_DATA_SECT with the current cluster alignment as follows (this has the effect of possibly expanding the root directory):

1. If NEW_FIRST_DATA_SECT is greater than OLD_FIRST_DATA_SECT:

a) DIFF=NEW_FIRST_DATA_SECT_OLD_FIRST_DATA_SECT.

b) Add (SECTS_PER_CLUST—(remainder of (DIFF/SECTS_PER_CLUST)) to NEW_FIRST_DATA_SECT.

2. Else if NEW_FIRST_DATA_SECT is less than OLD_FIRST_DATA_SECT:

a) DIFF=OLD_FIRST_DATA_SECT_NEW_FIRST_DATA_SECT.

b) Add the remainder of (DIFF/SECTS_PER_CLUST) to $NEW_{13}$ FIRST_DATA_SECT.

B. DATA_SECTS=TOTAL_SECTS—NEW_FIRST_DATA_SECT.

C. NUM_CLUSTERS=DATA_SECTS/SECTS_PER_CLUST.

D. Determine the new value for FAT_SECTS. For this calculation, the number must be rounded up, since any partial sector must be allocated for the file allocation table. Do this as follows:

1. If NUM_CLUSTERS is greater than 4085, FAT_SECTS=(NUM_CLUSTERS+2+16 BIT_CLUST_ENTS—1) /16 BIT_CLUST_ENTS.

2. If NUM CLUSTERS is smaller than or equal to 4085, FAT SECTS=(NUM_CLUSTERS+2+12 BIT_CLUST_ENTS—1)/12 BIT_CLUST_ENTS.

E. Record the values for FAT_SECTS, NUM_CLUSTERS, and NEW_FIRST_DATA_SECT as stated above in connection with the initial portion of step IX.

X. When the step IX loop terminates, compare the value of FAT_SECTS from the fourth iteration with the value of FAT_SECTS from the third iteration.

A. If the values are equal, or if the fourth iteration's value is the lower of the two values, then use the fourth iteration values of FAT_SECTS, NUM_CLUSTERS, and NEW_FIRST_DATA_SECT;

B. Otherwise, assign these variables their respective values at the end of the third iteration of the step IX loop.

XI. ROOT_SECTS=NEW_FIRST_DATA_SECT—(BOOT_SECTS+(FAT_SECTS×NUM_FATS)).

Having made the determinations regarding file allocation table(s) in the modified partition during the characteristic determining step 194 as described, the present method next performs an adjusting step 196. The adjusting step 196 ensures that no sectors previously identified as bad sectors lie within the proposed modified partition's system area (boot sector(s), root directory, and file allocation table(s)). If any sector having an address prior to NEW_FIRST_DATA_SECT within the system area of the proposed modified FAT partition has been identified as bad, either by its presence in the selected partition's bad sector list or by the presence of an error code from the disk drive 12 (FIG. 1) during the blocking step 192, then the implementing program should warn the user and exit without significantly altering the selected partition.

Otherwise, all data areas in the selected partition that will not lie within the data cluster area of the proposed modified partition are identified during an identifying step 198. All data within these areas must be cleared by being safely moved to locations inside the boundaries of the data cluster area of the modified partition, by data-preserving techniques familiar to those of skill in the art.

If the modified partition ending address is closer to the selected partition starting address than is the selected partition ending address, then all data clusters in the area between the selected partition ending address and the modified partition ending address must be scanned, and any allocated clusters must be moved from that area. In addition, the modified partition system area must always be checked; if it overlaps the first clusters of the selected partition then those affected data clusters must also be moved.

The size of the system structures in a FAT partition will usually range from thirty-five sectors (assuming one boot sector, two copies of the file allocation table at one sector apiece, and a 512-entry root directory requiring thirty-two sectors) to 545 sectors (assuming one boot sector, two copies of the file allocation table at the maximum size of 256 sectors apiece, and a 512-entry root directory requiring thirty-two sectors). However, the size of the FAT system structures may be greater due to a larger root directory, a larger boot area, or the presence in the selected partition of more than two copies of the file allocation table. The implementing program may therefore require the user to always have approximately 280 kilobytes plus the size of one cluster in free space on the disk 10 for the modified partition. Such a safety buffer will provide room to resize the system areas when the selected partition is resized.

There are circumstances when both the ending (high address) portion and the starting (low address) portion of the datacluster area must be moved. Care must then be taken to avoid damaging data moved from one area as data is moved from the other area. According to the present method, a chain of unallocated clusters may be marked and reserved to assist in accomplishing safe movement of data during FAT partition resizing.

To reserve disk space in a FAT file system partition when manipulating a FAT file system without help from, or knowledge of, the operating system, the present method provides the capability of temporarily reserving cluster chains in a "fixable" manner. That is, the cluster chains may be allocated by the implementing program in such a way that (a) file system structure consistency can always and easily be restored by a CHKDSK program in the event of a power outage, and (b) the operating system and disk utilities other than the implementing program are prevented from attempting to allocate and use these same clusters. Such "fixable" reservations may be utilized in situations where permanent allocation of disk space is not needed, and where it would be acceptable for a user to use CHKDSK to "fix" the disk if the power failed unexpectedly. According to this method, one or more FAT clusters may be chained together in a way which does not require any directory entries and does not require the CHKDSK program to create a file entry for lost clusters. Thus, CHKDSK is able to immediately return to general usage all such marked and/or chained clusters.

The cluster reservation method proceeds as follows. Initially, the first appropriate unallocated cluster is identified by searching the valid range in the file allocation table for cluster entries having a zero value. A one is entered in place of the zero to mark the cluster as a reserved part of the temporary storage allocation. All subsequent allocations of temporary storage should be in ascending sequence from each previous allocation. If this order is maintained, the "chain" is simply the sequential list of all clusters whose value is one.

Those of skill in the art will appreciate that there are 65,536 unique possible values for each cluster entry in a 16-bit FAT file allocation table. Because any value higher than one may be interpreted as possibly valid, the CHKDSK program will try to list each cluster containing values above one as a "lost cluster." To "fix" the FAT partition, the CHKDSK program must find a free directory entry in the root directory to hold the cluster(s) in each lost cluster chain. If there is no free entry, CHKDSK will fail to free the cluster. On the other hand, if the value is one, CHKDSK will treat the cluster as an "invalid cluster entry" and immediately return that cluster to general availability. Thus, the clusters marked with the value one according to the teachings herein are temporarily allocated for use in manipulating partitions, but not removed from subsequent use.

If the selected partition ending boundary is being changed to expand the selected partition, then it may be necessary to clear a portion of the data cluster area at the front of the selected partition that would otherwise be overwritten by the expanded system area of the modified partition. Although the area must be cleared if expansion of the selected partition causes the system structures to grow, expansion by only a small amount will not necessarily increase the size of the system structures.

If the selected partition ending boundary is moved to form a reduced modified partition, then the portion of the data cluster area at the high end of the selected partition must be cleared. All data clusters that will lie partially or entirely outside the modified partition must be relocated to other cluster locations that will lie within the modified partition.

A special case merits attention: if the cluster size is reduced as part of the resizing then the system area may grow due to an increase in the total number of clusters to be mapped on the partition, even though the data storage area of the partition is reduced. In this case, the portion of the data cluster area at the low end of the selected partition that will be covered by the expanded system area of the modified partition must also be cleared.

During a moving step 200, the data cluster regions identified during the identifying step 198 are cleared by moving the data to a safe location on the disk 10. The conventional method of moving clusters on a partition, which is employed by disk defragmentation and data recovery utilities, may be employed while repeating the following steps for each cluster that must be moved: Identify a cluster from the region which must be moved. Find a free cluster within the modified partition's data cluster area. Copy the data from the identified cluster to the free cluster. Mark the free cluster as used and update the file allocation table(s) on the disk 10. Adjust all references to the old cluster location to indicate the new location of the data. Such references may occur in the file allocation table(s) and/or in directory entries. The updating of directory back and self pointers may be performed at this time, or such updating may be postponed until a subsequent partition integrity verifying or reverifying step. Next, save the updated structures on the disk 10 (FIG. 1). Finally, mark the old cluster as free (or with the value of one to reserve it), and then save the file allocation table(s) to the disk 10 once again.

An adjusting step 202 adjusts the file system structures, boot sector, and partition table 32 (FIG. 2) as necessary. The file system structures will usually need to be resized to accommodate a modified partition that is either larger or a smaller than the selected partition. In resizing the system structures of a FAT partition, the new first cluster on the modified partition may be the same as the first cluster of the selected partition, or it may physically precede that original first cluster, or it may be located at the same place on the disk 10 as the second, third, fourth, etc., cluster of the selected partition.

The following rules are preferably followed regardless of whether the selected partition starting boundary, ending boundary, or both are moved. The selected partition should be changed to a recovery partition by placing the RPI on the disk 10 in the system indicator (50 in FIG. 3) of the appropriate partition identifier (36 in FIG. 3) as discussed above. In addition, if the selected partition is being extended by having its ending boundary moved, the partition size entries 44 and 46 should be simultaneously changed. If the selected partition contains the partition table 32 (FIG. 2) and the selected partition's starting boundary is being expanded, the partition table 32 must also be simultaneously moved to a safe and appropriate new location in the modified partition.

A FAT recovery sector is preferably created on the very last sector of the modified partition in substantially the manner previously discussed in connection with the creating step 170 (FIG. 8). The last sector of the modified partition will often be free at this point; if it is occupied by a used cluster of the selected partition (as may occur when shrinking the partition), it must first be cleared by moving its data to another free sector as described above in connection with the steps 198 and 200.

In performing the adjusting step 202 in a FAT partition, all cluster numbers of all clusters listed in all directory structures in the selected partition are adjusted by a constant factor FAT_SHIFT. The integer factor FAT_SHIFT equals the number of clusters by which the first cluster of the modified partition is offset from the first cluster of the selected partition. This adjustment can be performed safely only when the partition has been changed into a recovery partition by placement of the RPI on the disk 10 as described herein.

If FAT_SHIFT is non-zero, the implementing program traverses the directory structure and adjusts the starting cluster pointer for every file and for all directory cluster pointers (to self and to parent). If the modified partition's starting cluster physically precedes the selected partition's starting cluster on the partition, add FAT_SHIFT to each cluster pointer; if the reverse order holds, then subtract FAT_SHIFT from each cluster pointer. This adjustment is preferably accomplished in concert with the data recovery method to preserve integrity in the event of power failure.

Next, the boot sector is updated to reflect the size of the modified FAT partition, the size of the modified partition's file allocation table(s) and root directory, and other parameters readily determined by those of skill in the art in concert with the teachings herein.

The file allocation table(s) is/are then modified and saved to the disk 10 (FIG. 1). This is accomplished as follows. The value inside each cluster entry in the FAT must be both physically moved and logically modified by the value FAT_SHIFT. However, if the clusters have not been shifted (that is, if FAT_SHIFT is equal to zero), then these steps are omitted.

In modifying the file allocation table(s), all file allocation table entries are initially inspected to identify any entries which have the value one and thus are temporarily reserved in a fixable manner as previously described; all such entries are zeroed. A buffer NewFatEntry large enough to hold the new file allocation table is allocated and initialized to contain all zero entries. For notational convenience, the existing file allocation table of the selected partition is denoted OldFatEntry.

Each non-zero entry in the file allocation table(s) must be physically shifted FAT_SHIFT positions in the file allocation table(s) and all entries except bad cluster entries, end-of-chain entries, and temporarily allocated fixable entries, must also be adjusted by the factor FAT_SHIFT as follows. If the modified partition starting cluster physically precedes the selected partition starting cluster, then add FAT_SHIFT to each entry from the selected partition file allocation table(s) and then store that value to the modified partition file allocation table(s) entry that is FAT_SHIFT positions after it. For example, if OldFatEntry[ThisOne] is a bad cluster entry or an end-of-chain entry, do NewFatEntry[ThisOne+FAT_SHIFT]=OldFatEntry[ThisOne]; otherwise, do NewFatEntry[ThisOne+FAT_SHIFT]= OldFatEntry[ThisOne]+FAT_SHIFT. If the modified partition starting cluster physically succeeds the selected partition starting cluster then subtract FAT_SHIFT in an analogous manner: if OldFatEntry[ThisOne] is a bad-cluster entry or an end-of-chain entry, do NewFatEntry[ThisOne—FAT_SHIFT]=OldFatEntry[ThisOne]; otherwise, do NewFatEntry[ThisOne FAT_SHIFT]=OldFatEntry[ThisOne]—FAT_SHIFT. When these adjustments have been completed, write NUM_FATS copies of the file allocation table to the proper locations in the modified partition on the disk 10.

Figure 3:
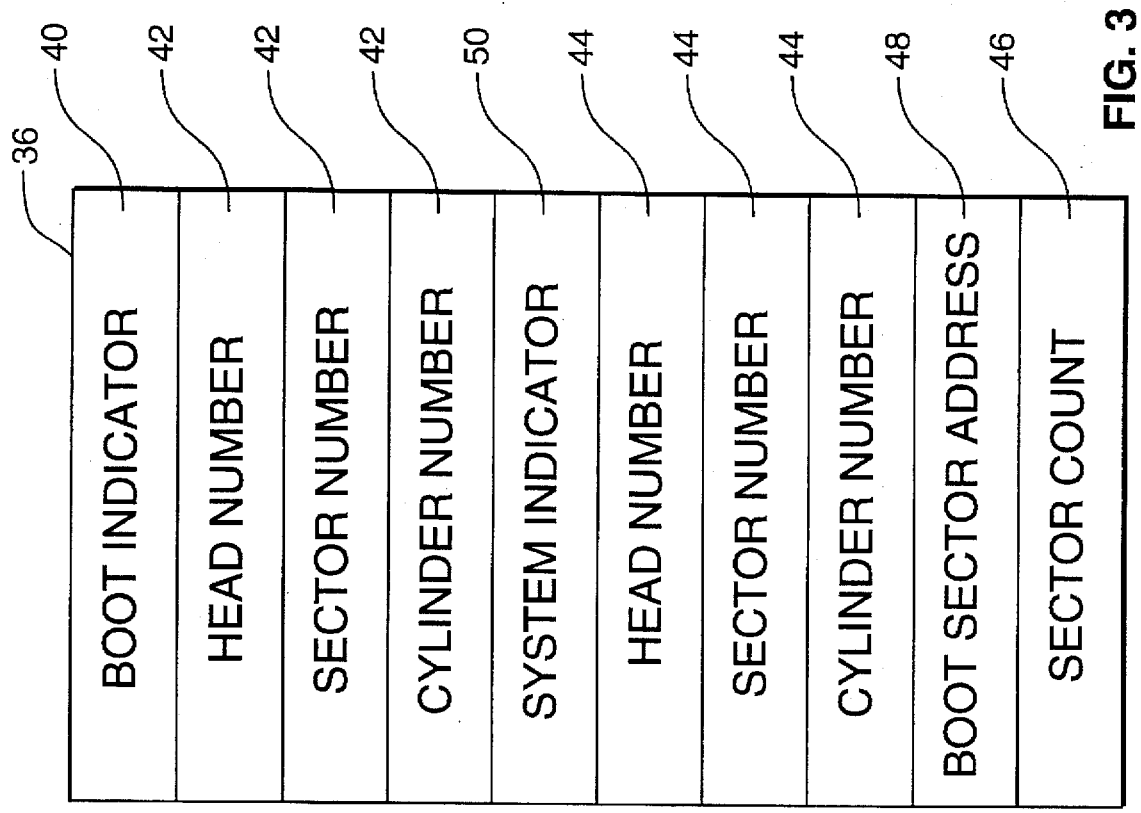
FIG. 3 is a diagram further illustrating a portion of the partition table shown in FIG. 2.

At this point, almost all changes inside the FAT partition are complete. If a recovery sector was placed on the disk 10 at the end of the modified partition, the contents of the recovery sector must be placed appropriately in the system area of the modified partition and the partition type must be restored to the appropriate type of FAT partition. If the selected partition was expanded, the partition size was already restored. If the selected partition was reduced, appropriate changes are made at this time in the partition table 32 (FIG. 2) on the disk 10 to reflect the boundaries and size of the modified partition. With reference to FIG. 3, the partition type indicated by the system indicator 50 in the modified partition's partition identifier 36 must reflect the recognized non-RPI type of the modified partition. If the selected partition was of a "hidden" type, the modified partition should be identified as being of a corresponding hidden type. Those of skill in the art will recognize the following as type values of FAT partitions, as indicated by the value of the system indicator 50 (other FAT-compatible file systems may use other type values):

a) Type 1 (that is, system indicator equal to 1) is a 12-bit FAT (4085 clusters or less). Type 11 hexadecimal is its hidden counterpart.

b) Type 4 is a 16-bit FAT (4086 clusters or more) under thirty-two megabytes. Type 14 hexadecimal is its hidden counterpart.

c) Type 6 is a 16-bit FAT greater than or equal to thirty-two megabytes. Type 16 hexadecimal is its hidden counterpart.

During an exiting step 204, the implementing program may check the FAT partition once more to ensure complete integrity. Any needed adjustments to back pointers for directories and other system structures may also be performed if those updates were skipped when moving clusters. As noted, it is also necessary to keep the partition locked until after rebooting if the operating system used on the computer does not support dynamic partition resynchronization through system calls or other means.

Moving and Copying Disk Partitions

With reference to FIG. 7, the moving/copying step 156 comprises either moving a partition or copying a partition, according to the user's wishes as indicated by interaction with the GUI 114 (FIG. 6). The moving/copying step 156 may be performed as taught herein on partitions containing any of a variety of familiar file systems, including without limitation HPFS and FAT file systems.

If the modified partition contains entirely different disk sectors than the selected partition and the selected partition remains intact on the disk 10 after the modified partition is made containing a copy of the selected partition's user data, then the selected partition has been copied. By contrast, if the modified and selected partitions have any disk sectors in common (making it impossible for the selected and modified partitions to exist simultaneously as distinct partitions on the disk 10), or if some selected partition disk sectors holding user data are freed, then the selected partition has been moved. Those of skill in the art will appreciate, however, that the steps described below are otherwise substantially the same for a move as for a copy. The term "replicate" is used herein to indicate moving and/or copying.

After a partition replicating operation, the partitions defined on the disk 10 should be as robust and safe as the selected partition was prior to that operation. This may be accomplished by making the implementing program consistent with the details and implications of the strategy used by the file system of the selected partition to maintain and manage the file system's bad sector list and the file system's other structures.

Figure 10:
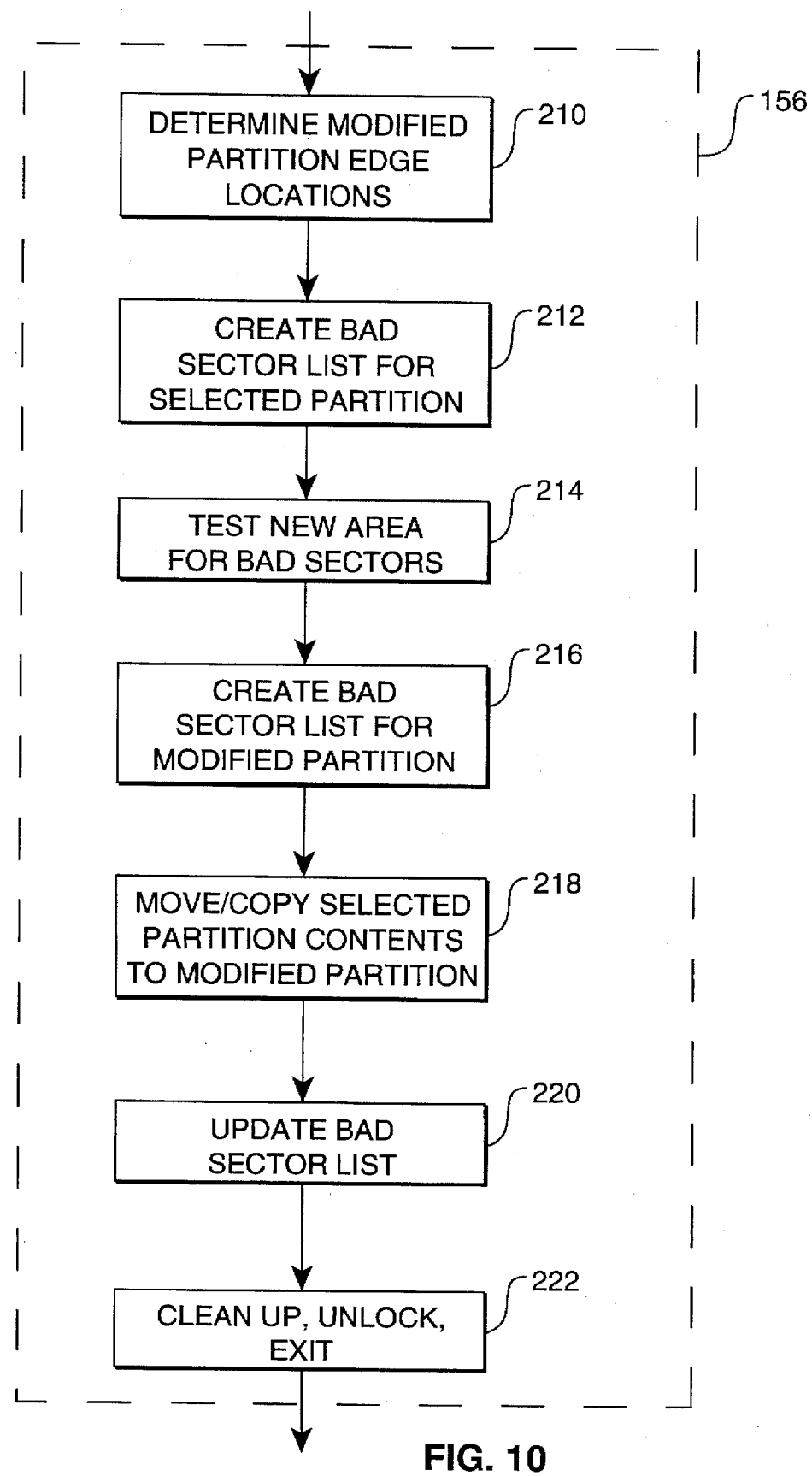
FIG. 10 is a flowchart further illustrating a partition moving/copying step shown in FIG. 7.

As illustrated in FIG. 10, the moving/copying step 156 includes a location determining step 210 which determines the location of the edges of the modified partition. The selected partition can be moved to any location on any disk in any drive attached to the computer, provided there is sufficient free disk space at the proposed location not currently claimed by another partition. In the event that the proposed modified partition will overlap the selected partition, there must be enough free space to accommodate that portion of the modified partition which does not overlap the selected partition.

The present method provides the capability of moving and copying partitions from a first disk ("source disk") attached to one disk drive to a second disk ("target disk") attached to a different disk drive. In this event, it is preferred that the source disk and the target disk each have the same number of cylinders, sides, and sectors per track. Otherwise, the move or copy can be safely accomplished only if the modified partition can be safely resized to fit in free space on the target disk in a manner that satisfies the clustering requirements of the file system (if any), and if corresponding changes can be made in the boot sector and other file system structures of the modified partition.

During a creating step 212, a first list or map is created of all disk sectors inside the selected partition that are marked as bad or unusable by the selected partition's file system. During a testing step 214, all sectors in the proposed modified partition area of the target disk are tested with read operations, write operations, or both, to identify any bad disk sectors. The addresses of any bad sectors found are placed in a second list or map of bad sectors. Sectors in the modified partition which also lie within the selected partition need not be tested. However, the bad sector list for the selected partition is inspected to identify any bad sectors that lie in both partitions. For each such bad sector, its logical sector address is converted to a logical sector address that is relative to the start of the modified partition. The converted logical address is then added to the second bad sector list.

During a creating step 216, a composite list of all bad sectors is created from the first and second lists just described. The composite list contains both the entire list of logical addresses of all bad sectors inside the selected partition and the entire list of logical addresses of bad sectors that exist in the proposed modified partition. All bad sectors identified in this composite list are then marked as bad inside the selected partition, after moving any data or file system structures that may currently occupy these sectors to newly allocated good sectors. This creating step 216 is preferably performed in concert with the data recovery method to preserve partition integrity in the event of power failure.

At this point, lock the partition. It is then safe to move or copy the selected partition during a moving/copying step 218. All good sectors in the selected partition which will overlay bad sectors in the modified partition have been blocked out such that all the data moved to the modified partition will be written to good sectors on the disk 10. The data is replicated by being written to the same relative position within the modified partition that it now occupies in the selected partition.

The data is replicated according to the following rules. First, only disk sectors containing data or disk sectors that are reserved for file system use are replicated. Substantial time may be saved by not replicating any free sectors or bad sectors and the integrity of the modified partition will not be compromised by this time-saving measure. If this rule is not followed, the replication will take longer. More importantly, the replication may fail during an attempt to replicate a bad sector.

Second, a disk sector copy buffer is used. The buffer size is the lesser of the amount of computer memory available and the product of the number of bytes per sector times the number of sectors between the selected partition's starting sector and the modified partition's starting sector.

Third, if the modified partition's physical starting address is greater than (to the right of) the starting address of the selected partition and the selected partition overlaps the proposed modified partition, then the selected partition must be replicated from the right to left (from sectors having higher addresses to those with lower addresses). Otherwise, the selected partition must be replicated from left to right. Following this rule prevents the overwriting of as yet unreplicated portions of the selected partition.

An appropriate data recovery method such as journaling, checkmarking, or a conventional data recovery method is preferably used during the moving/copying step 218. Thus, if the power fails prior to full completion of this process the process can be resynchronized and completed, or reversed by the user if desired. Checkmarking is preferred where bulk replication with no need to update system structures is performed.

At this point, the modified partition is substantially a copy of the original selected partition. Bad sectors identified in the selected partition in the first bad sector list which lie outside the modified partition are still marked bad in the composite list but can now be freed. These sectors are freed during an updating step 220 which does the following for each bad sector identified in the first list. Initially, a check is made to determine if the logical address of the bad sector is also listed in the composite list of bad sectors. If so, no adjustment is made; such coincidental listings must be identified to maintain complete integrity in the modified partition. If the sector is not in both lists, the sector's logical address is removed from the composite list of bad sectors (the list of modified partition bad sectors) and the sector is made available for allocation by the file system.

An exiting step 222 then cleans up other alterations made by the present method, restores the original system indicator 50 (FIG. 3), and exits back to the main routine shown in FIGS. 4 and 5 to commence the reverifying step 142.

An alternative method of the present invention allows the moving and copying of foreign or unknown partitions, which are indicated by unrecognized values of the system indicator 50 (FIG. 3). If the selected partition is to be copied to a target disk having a different number of cylinders, sides, or sectors per track than the source disk, no manipulation is performed. The implementing program simply explains the problem to the user and then exits.

Otherwise, the entire range of sectors inside the selected partition is tested for bad sectors, as is the entire range of sectors in the proposed modified partition. This test can be optimized to test each sector only once in the case where the modified and selected partitions overlap. If any bad sectors are identified in either test, no manipulation is performed. The implementing program simply explains to the user that the requested move or copy operation is unsafe and then exits.

If no bad sectors are found and if all sector addresses stored by the unknown file system are logical (relative to the partition starting address, as is the industry convention) rather than physical, then no adjustments will need to be made to the file system. Hence, no intimate knowledge of the unknown file system is required to perform the copy or move and the replication simply overlays the modified partition disk area with the entire selected partition contents according to the teachings herein. All sectors must be copied because there is no way of knowing which are in use and which are free without knowledge of the physical arrangement used by the file system to place data on the disk 10.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion; and resizing the selected partition to produce a modified partition having a different number of disk sectors than the selected partition, said resizing step comprising (a) determining The size of file system structures in a system area of the modified partition, (b) identifying a data area in the selected partition that will not lie within the data area of the modified partition but will instead be allocated to file system structures of the modified partition, and (c) clearing the data from the identified data area by physically relocating it to the data area of the modified partition while avoiding physical relocation of used data sectors in the selected partition that will lie within the data area of the modified partition.

2. The method of claim 1, further comprising the step of placing a recovery partition indicator on the disk.

3. The method of claim 1, further comprising the step of locking the selected partition prior to said resizing step.

4. The method of claim 1, further comprising the step of rebooting after said resizing step.

5. The method of claim 1, wherein said resizing step comprises placing a system indicator in a recovery sector on the disk.

6. The method of claim 1, wherein said resizing step comprises temporarily allocating sectors on the disk.

7. The method of claim 6, wherein said allocating step comprises placing the value one in cluster entries of a FAT partition.

8. The method of claim 1, wherein said resizing step comprises the step of adjusting the size and location of file system structures.

9. The method of claim 8, wherein said adjusting step comprises adjusting the file system structures substantially in order of decreasing file system structure size.

10. The method of claim 1, wherein said resizing step comprises determining the maximum size of the modified partition.

11. The method of claim 1, wherein said resizing step comprises determining the minimum size of the modified partition.

12. The method of claim 11, wherein said resizing step further comprises identifying a safety factor for use in determining the minimum size of the modified partition.

13. The method of claim 1, wherein said resizing step comprises moving the right edge of the selected partition.

14. The method of claim 1, wherein said resizing step further comprises the step of iteratively determining the number of disk sectors in a file allocation table of the modified partition.

15. A computer-implemented method for manipulating disk partitions, comprising the steps of:

selecting an IBM-compatible partition which is not an extended partition, the selected partition being located on a disk and having a left edge and a right edge, the disk being attached to a disk drive communicating with a source of electric power, the disk having at least one platter having a plurality of substantially concentric tracks, each track having a plurality of sectors arranged substantially in end-to-end fashion; and modifying the selected partition to produce a modified partition which is not an extended partition, the modified partition having a different number of disk sectors than the selected partition, wherein said modifying step comprises moving the left edge of the selected partition and adjusting the location of file system structures as needed to maintain their integrity and internal consistency in the modified partition, said modifying step being accomplished without destroying user data.

16. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion; and replicating the selected partition to produce a modified partition which excludes at least one track included in the selected partition, said replicating step comprising (a) creating a list of bad sectors which are in the selected partition or in the modified partition, and (b) avoiding the listed bad sectors while copying data and system information into the modified partition.

17. The method of claim 16, further comprising the step of placing a recovery partition indicator on the disk.

18. The method of claim 16, further comprising the step of locking the selected partition prior to said replicating step.

19. The method of 16, wherein said replicating step comprises identifying bad sectors which are located outside the modified partition and inside the selected partition and removing references to the identified bad sectors from file system structures of the modified partition.

20. The method of claim 16, wherein said replicating step comprises relocating disk sectors in the selected partition that would otherwise be copied to bad sectors in the modified partition such that the relocated disk sectors are copied instead to good sectors in the modified partition.

21. The method of claim 16, further comprising the step of rebooting after said replicating step.

22. The method of claim 16, wherein said replicating step comprises placing a system indicator in a recovery sector on the disk.

23. The method of claim 16, wherein said replicating step comprises temporarily allocating sectors on the disk.

24. The method of claim 23, wherein said allocating step comprises placing the value one in cluster entries of a FAT partition.

25. The method of claim 16, wherein said replicating step comprises copying partition contents from the disk containing the selected partition to another disk.

26. The method of claim 16, wherein the selected partition contains an unrecognized system identifier and said replicating step comprises verifying that no bad sectors are located in the selected partition and verifying that no bad sectors are located in the modified partition.

27. A computer-implemented method for manipulating disk partitions, comprising the steps of:

locating an IBM-compatible partition table on a disk, the disk attached to a disk drive communicating with a source of electric power, the disk having at least one platter having a plurality of substantially concentric tracks, each track having a plurality of sectors arranged substantially in end-to-end fashion;

selecting a partition from the partition table;

identifying a file system associated with the selected partition;

creating a list of bad sectors which are in the selected partition or in a modified partition to be produced from the selected partition; and modifying the selected partition and avoiding the listed bad sectors while producing the modified partition by a step selected from the group comprising:

shrinking the selected partition to produce the modified partition, the modified partition having fewer disk sectors than the selected partition;

expanding the selected partition to produce the modified partition, the modified partition having more disk sectors than the selected partition; and moving the selected partition to produce the modified partition at a new location, the modified partition excluding at least one track included in the selected partition, the modified partition and the selected partition having substantially the same number of disk sectors.

28. The method of claim 27, further comprising the step of verifying the integrity and consistency of internal file system data of the selected partition.

29. The method of claim 28, wherein said verifying step precedes said modifying step.

30. The method of claim 29, further comprising the step of reverifying the integrity and consistency of the internal file system data of the selected partition after said modifying step.

31. The method of claim 27, wherein said selecting step comprises selecting a logical partition from the partition table.

32. The method of claim 27, wherein said selecting step comprises selecting an extended partition from the partition table.

33. The method of claim 27, wherein said modifying step comprises preserving at least one copy of all user data on the disk at all times during said modifying step, thereby reducing the risk of loss of user data if the disk drive's communication with the source of electric power is temporarily interrupted during said modifying step.

34. The method of claim 27, wherein said modifying step comprises employing a data recovery method.

35. The method of claim 34, wherein said data recovery method comprises the step of storing progress markers on the disk within the selected partition, the progress markers corresponding to incrementally increasing portions of said modifying step, thereby removing the need to repeat all of said modifying step if said modifying step is resumed after the disk drive's communication with the source of electric power is temporarily interrupted during said modifying step.

36. The method of claim 27, wherein said identifying step comprises identifying a file system in the group consisting of the 12-bit FAT file system, the 16-bit FAT file system, the HPFS file system, and a recovery partition file system.

37. The method of claim 27, wherein said identifying step comprises identifying a file system in the group consisting of a FAT-compatible file system, the HPFS file system, and a recovery partition file system.

38. The method of claim 27, wherein said modifying step comprises determining the minimum size of the partition based on the file system contained in the selected partition and the amount of user data in the selected partition.

39. The method of claim 27, wherein said modifying step comprises said expanding step and said expanding step comprises producing a modified partition which includes at least one track closer to the center of the platter than any track in the selected partition.

40. The method of claim 27, wherein said modifying step comprises said expanding step and said expanding step comprises producing a modified partition which includes at least one track further away from the center of the platter than any track in the selected partition.

41. The method of claim 27, wherein said modifying step comprises said shrinking step and said shrinking step comprises producing a modified partition which includes at least one track closer to the center of the platter than any track in the selected partition.

42. The method of claim 27, wherein said modifying step comprises said shrinking step and said shrinking step comprises producing a modified partition which includes at least one track further away from the center of the platter than any track in the selected partition.

43. A method of manipulating a partition-molding disk for file system structures with the aid of a digital computer, comprising:

providing said computer with parameters for said disk partition including at least the number of heads, sides, and sectors per track of the disk, and the starting address and ending address of a selected partition on the disk;

initiating a partition manipulation operation upon locking out other processes from access to the disk and placing a recovery partition indicator on the disk;

iteratively modifying the file system structures on the disk with the aid of the computer; and opening the disk automatically for access to other processes when said modifying step is completed.

44. The method of claim 43, wherein said modifying step comprises shrinking said disk partition.

45. The method of claim 43, wherein said modifying step comprises expanding said disk partition.

46. The method of claim 43, wherein said modifying step comprises moving said disk partition to a new location.

47. The method of claim 43, further comprising the step of verifying the integrity and consistency of the file system structures.

48. The method of claim 43, wherein said disk partition is a logical partition.

49. The method of claim 43, wherein said disk partition is an extended partition.

50. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion;

resizing the selected partition to produce a modified partition having a different number of disk sectors than the selected partition, said resizing step comprising relocating disk sectors in the selected partition that would otherwise be copied to bad sectors in the modified partition such that the relocated disk sectors are copied instead to good sectors in the modified partition.

51. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion;

resizing the selected partition to produce a modified partition having a different number of disk sectors than the selected partition; and placing a recovery partition indicator on the disk.

52. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion;

resizing the selected partition to produce a modified partition having a different number of disk sectors than the selected partition, said resizing step comprising temporarily allocating sectors on the disk.

53. A computer-implemented method for manipulating disk partitions, comprising the steps selecting an IBM-compatible partition located on a disk, the partition having a left edge and a right edge, the disk attached to a disk drive communicating with a source of electric power, The disk having at least one platter having a plurality of substantially concentric tracks, each track having a plurality of sectors arranged substantially in end-to-end fashion;

resizing the selected partition to produce a modified partition having a different number of disk sectors than the selected partition, said resizing step comprising the step of adjusting the size and location of at least one file system structure that is located outside of any DOS file allocation table in the selected partition.

54. A computer-implemented method for manipulating disk partitions, comprising the steps of:

selecting an IBM-compatible partition which is not an extended partition, the selected partition being located on a disk, the selected partition having a left edge and a right edge, the disk attached to a disk drive communicating with a source of electric power, the disk having at least one platter having a plurality of substantially concentric tracks, each track having a plurality of sectors arranged substantially in end-to-end fashion;

resizing the selected partition to produce a modified partition having a different number of disk sectors than the selected partition, said resizing step comprising the step of moving the left edge of the selected partition and adjusting the location of file system structures as needed to maintain their integrity and internal consistency in the modified partition, said resizing step being accomplished without destroying user data.

55. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion;

resizing the selected partition in place to produce a modified partition having a different number of disk sectors than the selected partition, said resizing step comprising adjusting the size of FAT file system structures such that the total number of sectors allocated to all file system structures is adjusted only by an integer multiple of the cluster size, said resizing step performed without destroying user data.

56. A computer-implemented method for manipulating disk partitions, comprising the steps of:

selecting an IBM-compatible HPFS partition located on a disk, the selected HPFS partition having a left edge and a right edge, the disk attached to a disk drive communicating with a source of electric power, the disk having at least one platter having a plurality of substantially concentric tracks, each track having a plurality of sectors arranged substantially in end-to-end fashion; and enlarging the selected HPFS partition in place without destroying user data to produce a modified HPFS partition having more disk sectors than the selected HPFS partition.

57. A computer-implemented method for manipulating disk partitions, comprising the steps of:

selecting an IBM-compatible HPFS partition located on a disk, the selected HPFS partition having a directory band, a left edge, and a right edge, the disk attached to a disk drive communicating with a source of electric power, the disk having at least one platter having a plurality of substantially concentric tracks, each track having a plurality of sectors arranged substantially in end-to-end fashion; and resizing the selected HPFS partition in place without destroying user data to produce a modified MPFS partition having a different number of disk sectors than the selected HPFS partition, at least one of the size and the location of the directory band of the modified HPFS partition being substantially different from the respective size and location of the directory band of the selected HPFS partition.

58. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion; and replicating the selected partition to produce a modified partition which excludes at least one track included in the selected partition, said replicating step comprising placing a recovery partition indicator on the disk.

59. A computer-implemented method for manipulating disk partitions, comprising the steps of:

selecting an IBM-compatible partition located on a disk, the partition having a left edge and a right edge, the disk attached to a disk drive communicating with a source of electric power, the disk having at least one platter having a plurality of substantially concentric tracks, each track having a plurality of sectors arranged substantially in end-to-end fashion; and modifying the selected partition to produce a modified partition by resizing the clusters in the selected partition without destroying user data, the modified partition having a different cluster size than the selected partition.

60. The method of claim 59, further comprising the step of placing a recovery partition indicator on the disk.

61. The method of claim 59, wherein said modifying step comprises updating a list of bad sectors.

62. The method of claim 59, wherein said modifying step comprises temporarily allocating sectors on the disk in a fixable manner.

63. The method of claim 59, wherein said modifying step comprises the step of iteratively determining the number of clusters in a file allocation table of the modified partition.

64. The method of claim 59, wherein the cluster size of the modified partition is larger than the cluster size of the selected partition and said modifying step comprises the step of aligning newly created clusters.

65. The method of claim 59, wherein the cluster size of the modified partition is smaller than the cluster size of the selected partition and said modifying step comprises the step of freeing newly created unused clusters.

66. The method of claim 59, wherein said modifying step comprises preserving at least one copy of all user data on the disk at all times during said modifying step, thereby reducing the risk of loss of user data if the disk drive's communication with the source of electric power is temporarily interrupted during said modifying step.

67. The method of claim 59, wherein the selected partition is a FAT-compatible file system partition.

* * * * *